US009607151B2

(12) United States Patent
Mooring et al.

(10) Patent No.: US 9,607,151 B2
(45) Date of Patent: Mar. 28, 2017

(54) SYSTEMS AND METHODS INVOLVING FEATURES OF HARDWARE VIRTUALIZATION SUCH AS SEPARATION KERNEL HYPERVISORS, HYPERVISORS, HYPERVISOR GUEST CONTEXT, HYPERVISOR CONTEXT, ROOTKIT DETECTION/PREVENTION, AND/OR OTHER FEATURES

(71) Applicant: Lynx Software Technologies, Inc., San Jose, CA (US)

(72) Inventors: Edward T. Mooring, Santa Clara, CA (US); Phillip Yankovsky, Campbell, CA (US)

(73) Assignee: Lynx Software Technologies, Inc., San Jose, CA (US)

( * ) Notice: Subject to any disclaimer, the term of this patent is extended or adjusted under 35 U.S.C. 154(b) by 0 days.

(21) Appl. No.: 14/583,585

(22) Filed: Dec. 26, 2014

(65) Prior Publication Data
US 2015/0213264 A1 Jul. 30, 2015

Related U.S. Application Data

(63) Continuation of application No. PCT/US2013/048014, filed on Jun. 26, 2013, which
(Continued)

(51) Int. Cl.
*G06F 21/56* (2013.01)
*G06F 21/62* (2013.01)
(Continued)

(52) U.S. Cl.
CPC ........ *G06F 21/566* (2013.01); *G06F 9/45533* (2013.01); *G06F 9/45545* (2013.01);
(Continued)

(58) Field of Classification Search
CPC .. G06F 21/56; G06F 9/45533; G06F 9/45545; G06F 9/45558; G06F 21/50;
(Continued)

(56) References Cited

U.S. PATENT DOCUMENTS 6,049,316 A 4/2000 Nolan et al.
7,035,963 B2 4/2006 Neiger et al.
(Continued)

FOREIGN PATENT DOCUMENTS

JP 2010-049627 3/2010
RU 2259582 C2 8/2005
(Continued)

OTHER PUBLICATIONS

Day et al. "Hardware Virtualization puts a new spin on Secure Systems" COTS Journal, Aug. 2010, pp. 1-2 http://www.lynuxworks.com/virtualization/virtualization-hardware.php.*
(Continued)

*Primary Examiner* — Jung Kim
*Assistant Examiner* — Carlos M De Jesus Lassala
(74) *Attorney, Agent, or Firm* — Knobbe Martens Olson & Bear LLP

(57) ABSTRACT

Systems, methods, computer readable media and articles of manufacture consistent with innovations herein are directed to computer virtualization, computer security and/or data isolation. According to some illustrative implementations, innovations herein may utilize and/or involve a separation kernel hypervisor which may include the use of a guest operating system virtual machine protection domain, a virtualization assistance layer, and/or a rootkit defense mechanism (which may be proximate in temporal and/or spatial locality to malicious code, but isolated from it), inter alia, for detection and/or prevention of malicious code, for example, in a manner/context that is isolated and not able to be
(Continued)

corrupted, detected, prevented, bypassed, and/or otherwise affected by the malicious code.

27 Claims, 18 Drawing Sheets

Related U.S. Application Data is a continuation of application No. 14/294,022, filed on Jun. 2, 2014, now Pat. No. 9,218,489, which is a continuation of application No. 13/928,373, filed on Jun. 26, 2013, now Pat. No. 8,745,745.

(60) Provisional application No. 61/664,646, filed on Jun. 26, 2012.

(51) Int. Cl.
  *G06F 9/455*  (2006.01)
  *G06F 21/53*  (2013.01)
  *G06F 21/50*  (2013.01)
  *G06F 21/55*  (2013.01)
  *G06F 21/60*  (2013.01)
  *G06F 21/57*  (2013.01)

(52) U.S. Cl.
  CPC .......... *G06F 9/45558* (2013.01); *G06F 21/50* (2013.01); *G06F 21/53* (2013.01); *G06F 21/556* (2013.01); *G06F 21/56* (2013.01); *G06F 21/572* (2013.01); *G06F 21/60* (2013.01); *G06F 21/629* (2013.01); *G06F 2009/45587* (2013.01); *G06F 2221/033* (2013.01); *G06F 2221/034* (2013.01); *G06F 2221/2125* (2013.01)

(58) Field of Classification Search
  CPC ...... G06F 21/53; G06F 21/556; G06F 21/572; G06F 21/60; G06F 2009/45587; G06F 21/554; G06F 21/566; G06F 21/629; G06F 2221/033; G06F 2221/034; G06F 2221/2125
  See application file for complete search history.

(56) References Cited

U.S. PATENT DOCUMENTS

| | | |
|---|---|---|
| 7,992,144 B1 | 8/2011 | Hendel |
| 8,056,076 B1 | 11/2011 | Hutchins et al. |
| 8,073,990 B1 | 12/2011 | Baron et al. |
| 8,141,163 B2 | 3/2012 | Pike |
| 8,200,796 B1 | 6/2012 | Margulis |
| 8,352,941 B1 | 1/2013 | Protopopoy et al. |
| 8,458,697 B2 | 6/2013 | Amano et al. |
| 8,490,086 B1 | 7/2013 | Cook |
| 8,539,584 B2 | 9/2013 | Ramallingam |
| 8,549,643 B1 | 10/2013 | Shou |
| 8,584,211 B1 | 11/2013 | Vetter et al. |
| 2002/0166059 A1* | 11/2002 | Rickey ................. G06F 21/575 726/24 |
| 2003/0093682 A1* | 5/2003 | Carmona ............... G06F 21/562 713/187 |
| 2004/0174352 A1 | 9/2004 | Wang |
| 2004/0177264 A1 | 9/2004 | Anson |
| 2004/0221009 A1 | 11/2004 | Cook et al. |
| 2005/0105608 A1 | 5/2005 | Coleman et al. |
| 2005/0210158 A1 | 9/2005 | Cowperthwaite |
| 2005/0216759 A1 | 9/2005 | Rothman et al. |
| 2005/0223238 A1 | 10/2005 | Schmid et al. |
| 2006/0184937 A1 | 8/2006 | Abels |
| 2007/0050764 A1 | 3/2007 | Traut |
| 2007/0057957 A1 | 3/2007 | Wooten |
| 2007/0089111 A1 | 4/2007 | Robinson et al. |
| 2007/0136506 A1 | 6/2007 | Traut |
| 2008/0016570 A1 | 1/2008 | Capalik |
| 2008/0127336 A1 | 5/2008 | Sun et al. |
| 2008/0215770 A1 | 9/2008 | Liu et al. |
| 2008/0244212 A1* | 10/2008 | Rothman ................. G06F 12/08 711/172 |
| 2008/0263659 A1 | 10/2008 | Alme |
| 2008/0282117 A1 | 11/2008 | Partani et al. |
| 2008/0320594 A1 | 12/2008 | Jiang |
| 2009/0055571 A1* | 2/2009 | Budko ..................... G06F 21/53 711/6 |
| 2009/0099988 A1 | 4/2009 | Stokes et al. |
| 2009/0158432 A1* | 6/2009 | Zheng .................. G06F 21/562 726/24 |
| 2009/0204964 A1 | 8/2009 | Foley et al. |
| 2009/0254990 A1 | 10/2009 | McGee |
| 2009/0288167 A1* | 11/2009 | Freericks ................ G06F 21/54 726/23 |
| 2009/0328225 A1 | 12/2009 | Chambers et al. |
| 2010/0027552 A1 | 2/2010 | Hill |
| 2010/0031325 A1 | 2/2010 | Maigne et al. |
| 2010/0077481 A1 | 3/2010 | Polyakov et al. |
| 2010/0146267 A1 | 6/2010 | Konetski |
| 2010/0328064 A1 | 12/2010 | Rogel |
| 2011/0126139 A1 | 5/2011 | Jeong |
| 2011/0141124 A1 | 6/2011 | Halls |
| 2011/0145886 A1 | 6/2011 | McKenzie et al. |
| 2011/0145916 A1 | 6/2011 | McKenzie et al. |
| 2011/0161482 A1 | 6/2011 | Bonola et al. |
| 2011/0167422 A1 | 7/2011 | Eom et al. |
| 2011/0185063 A1 | 7/2011 | Head et al. |
| 2011/0225458 A1 | 9/2011 | Zuo et al. |
| 2011/0225655 A1* | 9/2011 | Niemela ............... G06F 21/566 726/24 |
| 2011/0307888 A1 | 12/2011 | Raj et al. |
| 2012/0035681 A1 | 2/2012 | Maximilien |
| 2012/0066680 A1 | 3/2012 | Amano et al. |
| 2012/0185913 A1 | 7/2012 | Martinez et al. |
| 2013/0024940 A1 | 1/2013 | Hutchins et al. |
| 2013/0097356 A1 | 4/2013 | Dang et al. |
| 2013/0312099 A1 | 11/2013 | Edwards et al. |
| 2013/0347131 A1 | 12/2013 | Mooring et al. |

FOREIGN PATENT DOCUMENTS

| | | |
|---|---|---|
| WO | WO 2008/091452 | 7/2008 |
| WO | WO 2010/021631 A1 | 2/2010 |
| WO | WO2010021631 * | 2/2010 |
| WO | WO 2012/177464 | 12/2012 |
| WO | WO 2016/004263 | 1/2016 |

OTHER PUBLICATIONS

Embedded computing design, "Advances in Virtualization aid information assurance", Jan. 2008, ppl-8, http://embedded-computing.com/article-id/72571.*

Day et al. "Secure Virtualization combines Traditional Desktop OSs and Embedded RTOSs in Military Embedded Systems", Military Embedded Systems, May 2010, pp. 1-4 http://www.lynuxworks.com/virtualization/secure-virtualization-desktop-os.php.*

DeLong et al. "Seperation Kernel for a Secure Real-time operating System" Jun. 2010, pp. 1-3,http://web.archive.Org/web/20100630223040/http://www.lynuxworks.com/products/whitepapers/separation-kernel.php.*

Day et al., "Virtualization: Keeping Embedded Software safe and Secure in an Unsafe World Secure virtualization for real-time, Linux and Windows systems", EE Times, Jun. 2010, pp. 1-3 http://www.lynuxworks.com/virtualization/keeping-embedded-software-secure.php.*

Iqbal et al., "An Overview of Microkernel, Hypervisor and Microvisor Virtualization Approaches for Embedded Systems" 2010, pp. 1-15 http://www.techrepublic.com/resource-library/whitepapers/an-overview-of-microkernel-hypervisor-and-microvisor-virtualization-approaches-for-embedded-systems/.*

Lynuxworks, "Secure Client Virtualization Based on Military-

(56) References Cited

OTHER PUBLICATIONS

Grade Technology", May 2011, pp. 1-8 http://web.archive.org/web/20110310051907/http://www.lynuxworks.com/virtualization/secure-client-virtualization.php.*

Hoffman et al., "User Mode Versus Privileged Mode Processor Usage," Sep. 2010, pp. 1-2, http://blogs.technet.com/b/perfguide/archive/2010/09/28/user-mode-versus-privileged-mode-processor-usage-aspx; 2 pgs.

International Preliminary Report on Patentability dated Dec. 31, 2014 (1 pg) and International Search Report and Written Opinion dated Feb. 27, 2014 (15 pgs) in related PCT application No. PCT/US2013/048014, Invitation to Pay Additional Fees in related PCT/US2013/48014, dated Jan. 3, 2014, (2 pgs.) 18 pgs. total.

\* cited by examiner

SYSTEMS AND METHODS INVOLVING FEATURES OF HARDWARE VIRTUALIZATION SUCH AS SEPARATION KERNEL HYPERVISORS, HYPERVISORS, HYPERVISOR GUEST CONTEXT, HYPERVISOR CONTEXT, ROOTKIT DETECTION/PREVENTION, AND/OR OTHER FEATURES

CROSS REFERENCE TO RELATED APPLICATION(S)

This application is a continuation (bypass) of appln. No. PCT/US2013/048014, filed Jun. 26, 2013, published as WO2014/004747A2 and of application Ser. No. 14/294,022, filed Jun. 2, 2014, which is a continuation of application Ser. No. 13/928,373, now U.S. Pat. No. 8,745,745, which claim benefit/priority of U.S. provisional patent application No. 61/664,646, filed Jun. 26, 2012, and which are all incorporated herein by reference in entirety.

BACKGROUND

Field

Innovations herein pertain to computer virtualization, computer security and/or data isolation, and/or the use of a separation kernel hypervisor (and/or hypervisor), such as to detect and/or prevent malicious code and which may include or involve guest operating system(s).

Description of Related Information

In computer systems with hypervisors supporting a guest operating system, there exist some means to monitor the guest operating system for malicious or errant activity.

However, due to the constantly evolving nature of malicious code, such systems face numerous limitations in their ability to detect and defeat malicious code. One major limitation is the inability of a hypervisor to defend itself against malicious code; e.g., the particular hypervisor may be subverted by malicious code and/or may allow malicious code in a guest operating system to proliferate between a plurality of guest operating systems in the system.

To solve that issue, the motivation and use of a Separation Kernel Hypervisor is introduced in environments with malicious code. The Separation Kernel Hypervisor, unlike a hypervisor, does not merely support a plurality of Virtual Machines (VMs), but supports more secure, more isolated mechanisms, including systems and mechanisms to monitor and defeat malicious code, where such mechanisms are isolated from the malicious code but are also have high temporal and spatial locality to the malicious code. For example, they are proximate to the malicious code, but incorruptible and unaffected by the malicious code.

Furthermore the Separation Kernel Hypervisor is designed and constructed from the ground-up, with security and isolation in mind, in order to provide security and isolation (in time and space) between a plurality of software entities (and their associated/assigned resources, e.g., devices, memory, etc.); by mechanisms which may include Guest Operating System Virtual Machine Protection Domains (secure entities established and maintained by a Separation Kernel Hypervisor to provide isolation in time and space between such entities, and subsets therein, which may include guest operating systems, virtualization assistance layers, and rootkit defense mechanisms); where such software entities (and their associated assigned resources, e.g., devices, memory, etc., are themselves isolated and protected from each other by the Separation Kernel Hypervisor, and/or its use of hardware platform virtualization mechanisms.

Additionally, where some hypervisors may provide mechanisms to communicate between the hypervisor and antivirus software, or monitoring agent, executing within a guest operating system (for purposes of attempting to monitor malicious code), the hypervisor is not able to prevent corruption of the monitoring agent where the agent is within the same guest operating system as the malicious code; or the guest operating system (or any subset thereof, possibly including the antivirus software, and/or monitoring agent) is corrupted and/or subverted by malicious code.

With a Separation Kernel Hypervisor, one may use a defense-in-depth technique in order to provide a runtime execution environment whereby software can securely monitor for malicious code without being affected or corrupted by it; while at the same time having close proximity (in time and space) to the malicious code (or code, data, and/or resources under monitoring).

As well, where hypervisors may be used to attempt to detect and monitor malicious code, they may do so in a very limited fashion; e.g., they may attempt to use a software driver or application within a Guest Operating system in order to monitor for corruption of certain (sensitive) tables within the kernel of that guest operating system. In addition to such naïve mechanisms executing within the guest operating system (which may be subverted by malicious code, as in the example above), the defense of a narrow number of types of resources, e.g., systems tables (e.g., Systems Software Descriptor Table (SSDT), as used by variants of the Windows OS) may be limiting and ineffective when dealing with complex and/or adaptive malicious code that attempt to execute and conceal itself with sophisticated techniques (the construction of which may be sponsored by nation states with extremely high levels of resources).

OVERVIEW OF SOME ASPECTS

Systems, methods, computer readable media and articles of manufacture consistent with innovations herein are directed to computer virtualization, computer security and/or data isolation, and/or the use of a Separation Kernel Hypervisor (and/or hypervisor), such as to detect and/or prevent malicious code and which may include or involve guest operating system(s).

According to some illustrative implementations, innovations herein may utilize and/or involve a separation kernel hypervisor which may include the use of a guest operating system virtual machine protection domain, a virtualization assistance layer, and/or a rootkit defense mechanism (which may be proximate in temporal and/or spatial locality to malicious code, but isolated from it), inter alia, for detection and/or prevention of malicious code, for example, in a manner/context that is isolated and not able to be corrupted, detected, prevented, bypassed, and/or otherwise affected by the malicious code.

It is to be understood that both the foregoing general description and the following detailed description are exemplary and explanatory only and are not restrictive of the inventions, as described. Further features and/or variations may be provided in addition to those set forth herein. For example, the present inventions may be directed to various combinations and subcombinations of the disclosed features and/or combinations and subcombinations of several further features disclosed below in the detailed description.

BRIEF DESCRIPTION OF THE DRAWINGS

The accompanying drawings, which constitute a part of this specification, illustrate various implementations and features of the present innovations and, together with the description, explain aspects of the inventions herein. In the drawings.

DETAILED DESCRIPTION OF ILLUSTRATIVE IMPLEMENTATIONS

Figure 1:
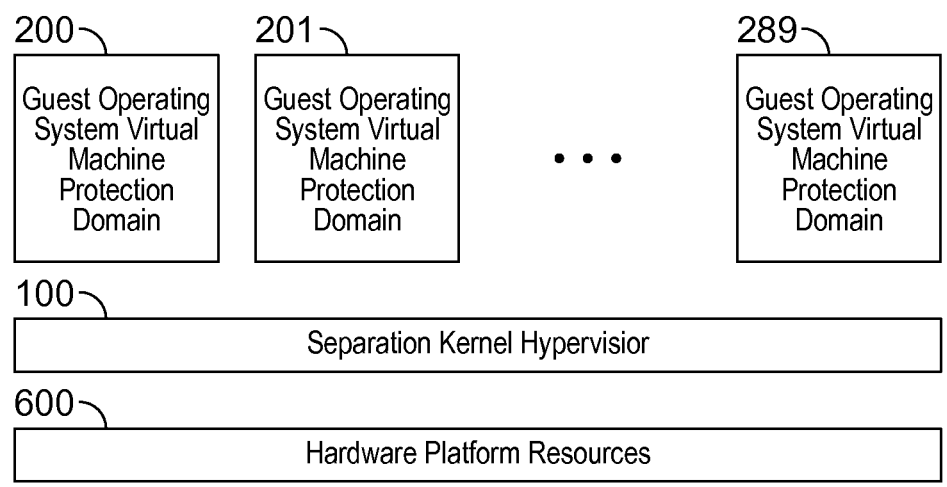
FIG. 1 is a block diagram illustrating an exemplary system and Separation Kernel Hypervisor architecture consistent with certain aspects related to the innovations herein.

Reference will now be made in detail to the inventions herein, examples of which are illustrated in the accompanying drawings. The implementations set forth in the following description do not represent all implementations consistent with the inventions herein. Instead, they are merely some examples consistent with certain aspects related to the present innovations. Wherever possible, the same reference numbers are used throughout the drawings to refer to the same or like parts.

To solve one or more of the drawbacks mentioned above and/or other issues, implementations herein may relate to various detection, monitoring, and/or prevention techniques, systems, and mechanisms, as may be used with a separation kernel hypervisor. Among other things, such systems and methods may include and/or involve the use of the monitoring of the entirety, or suitably configured subset thereof of guest operating system resources including virtualized resources, and/or "physical" or "pass-through" resources. Examples include monitoring of the virtual CPUs, its memory access attempts via CPU or DMA, and/or virtual device access attempts such as monitoring the boot records of devices where malicious code likes to manipulate/hide, and the like.

With regard to certain implementations, in order to perform such advanced monitoring in a manner that maintains suitable performance characteristics in a system that may include a separation kernel hypervisor and a guest operating system, mechanisms such as a separation kernel hypervisor, a guest operating system virtual machine protection domain, virtual machine assistance layer, and/or rootkit and/or bootkit (hereinafter referred to together as just "rootkit") defense mechanisms, may be used to monitor a guest operating system.

Systems and methods are disclosed for providing secure information monitoring. According to some implementations, for example, such information monitoring may be provided from a context not able to be bypassed, tampered with or by the context under monitoring. Here, monitoring may also be performed in a timely and expeditious fashion, including by virtue of the monitoring context being proximate (in time and space) to the monitored context. Additionally, isolation may be maintained between the monitor and monitored context. Further, such monitoring may be performed by mechanisms providing a wide and comprehensive set of monitoring techniques and resources under monitoring, inter alia, so as to monitor against threats which are multi-lateral and/or multi-dimensional in nature.

In one exemplary implementation, there is provided a method of secure domain isolation, whereby an execution context within a virtual machine may monitor another execution context within that virtual machine or another virtual machine, in a manner maintaining security and isolation between such contexts. Innovations herein also relate to provision of these contexts such that neither/none can necessarily corrupt, affect, and/or detect the other.

Moreover, systems and methods herein may include and/or involve a virtual machine which is augmented to form a more secure virtual representation of the native hardware platform for a particular execution context. And such implementations may also include a virtual representation which is augmented with a wide and deep variety of built-in detection and monitoring mechanisms, wherein secure isolation between the domains or virtual machines is maintained.

In general, aspects of the present innovations may include, relate to, and/or involve one or more of the following aspects, features and/or functionality. Systems and methods herein may include or involve a separation kernel hypervisor. According to some implementations, a software entity in hypervisor context that partitions the native hardware platform resources, in time and space, in an isolated and secure fashion may be utilized. Here, for example, embodiments may be configured for partitioning/isolation as between a plurality of guest operating system virtual machine protection domains (e.g., entities in a hypervisor guest context).

The separation kernel hypervisor may host a plurality of guest operating system virtual machine protection domains and may host a plurality of rootkit defense mechanisms including root kit defense mechanisms which may execute within such guest operating system virtual machine protection domains. The rootkit defense mechanisms may execute in an environment where guest operating systems cannot tamper with, bypass, or corrupt the rootkit defense mechanisms. The rootkit defense mechanisms may also execute to increase temporal and spatial locality of the guest operating system's resources. Further, in some implementations, the rootkit defense mechanisms may execute in a manner that is not interfered with, nor able to be interfered with, nor corrupted by other guest operating system virtual machine protection domains including their corresponding guest operating systems. The rootkit defense mechanisms include, but are not limited to, performing one or more of the following actions on guest operating systems such as monitoring of guest OS memory access, guest OS I/O port access, guest OS PCI configuration space access, guest OS virtual device interfaces, guest OS device interfaces, DMA generated by guest OS devices with DMA engines and/or DMA capability, guest OS firmware access or access to firmware interfaces or sensitive platform interfaces, device plug-in or unplugging, power management, and virtual power management, activities and/or transitions.

Where monitoring may include, but is not limited to, actions pertaining to observation, detection, mitigation, prevention, tracking, modification, reporting upon, of code, data, execution flow, and other resource utilization (at runtime and in static context) within and/or by a guest operating system and/or by entities configured to perform such monitoring for purposes which may be used to ascertain, and assist in ascertaining, when and where malicious code, suspect code, and/or code under general monitoring or instrumented execution/debugging, unit test, regression test, or similar scrutiny, is or may be operating, hiding and/or concealed, halted, stalled, infinitely looping, making no progress beyond its intended execution, stored and/or present (either operating or not), once-active (e.g., extinct/not present, but having performed suspect and/or malicious action), and otherwise having been or being in a position to adversely and/or maliciously affect the hypervisor guest, or resource under control of the hypervisor guest.

FIG. 1 is a block diagram illustrating an exemplary system and separation kernel hypervisor architecture consistent with certain aspects related to the innovations herein. FIG. 1 also shows a separation kernel hypervisor executing on native hardware platform resources, e.g., where the separation kernel hypervisor may support the execution, isolated and partitioned in time and space, between a plurality of guest operating system protection domains. Here, a guest operating system domain may be an entity that is established and maintained by the separation kernel hypervisor in order to provide a secure and isolated execution environment for software. Referring to FIG. 1, a separation kernel hypervisor 100 is shown executing on top of the native hardware platform resources 600. Further, the separation kernel hypervisor 100 supports the execution of a guest operating system virtual machine protection domain 200.

The separation kernel hypervisor 100 may also support the execution of a plurality of guest operating system virtual machine protection domains, e.g., 200 to 299 in FIG. 1. In some implementations, the separation kernel hypervisor may provide time and space partitioning in a secure and isolated manner for a plurality of guest operating system virtual machine protection domains, e.g., 200 to 299 in FIG. 1. Such features may include rigid guarantees on scheduling resources, execution time, latency requirements, and/or resource access quotas for such domains.

According to some implementations, in terms of the sequence of establishment, after the native hardware platform resources 600 boot the system, execution is transitioned to the separation kernel hypervisor 100. The separation kernel hypervisor 100 then creates and executes a guest operating system virtual machine protection domain 200, or a plurality of guest operating system virtual machine protection domains, e.g., 200 to 299 in FIG. 1. Some implementations of doing so consonant with the innovations herein are set forth in PCT Application No. PCT/2012/042330, filed 13 Jun. 2012, published as WO2012/177464A1, which are incorporated herein by reference in entirety.

Consistent with aspects of the present implementations, it is within a guest operating system virtual machine protection domain that a guest operating system may execute. Further, it is within a guest operating system virtual machine protection domain that rootkit defense mechanisms may also execute, e.g., in a fashion isolated from any guest operating system which may also execute within that same guest operating system virtual machine protection domain, or in other guest operating system virtual machine protection domains.

Figure 2A:
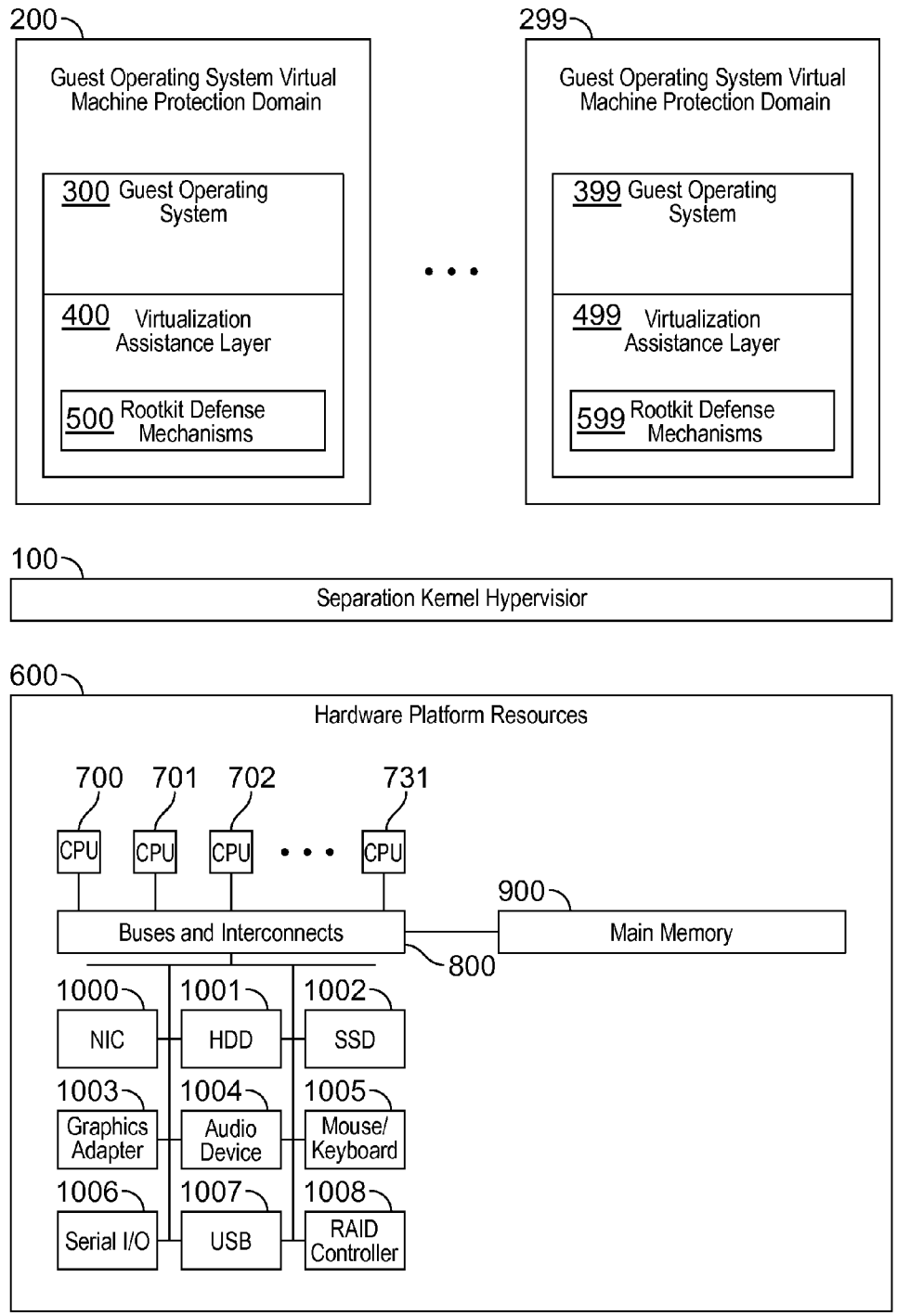
FIG. 2A is a block diagram illustrating an exemplary system and Separation Kernel Hypervisor architecture consistent with certain aspects related to the innovations herein.

FIG. 2A is a block diagram illustrating an exemplary system and separation kernel hypervisor architecture consistent with certain aspects related to the innovations herein. FIG. 2A also shows a separation kernel hypervisor executing on native hardware platform resources (where the native platform resources may include a plurality of CPUs, buses and interconnects, main memory, Network Interface Cards (NIC), Hard Disk Drives (HDD), Solid State Drives (SSD), Graphics Adaptors, Audio Devices, Mouse/Keyboard/Pointing Devices, Serial I/O, USB, and/or Raid Controllers, etc.), where the separation kernel hypervisor may support the execution, isolated and/or partitioning in time and space, between a plurality of guest operating system protection domains. Here, some implementations may involve a guest operating system protection domains which may contain a guest operating system, and/or a virtualization assistance layer (which itself may contain rootkit defense mechanisms).

FIG. 2A shows both a guest operating system 300, and a virtualization assistance layer 400 executing within the same guest operating system virtual machine protection domain 200. In some implementations, the virtualization assistance layer 400 may provide the execution environment for the rootkit defense mechanisms 500. Further, the virtualization assistance layer 400 may assist the separation kernel hypervisor in virtualizing portions of the platform resources exported to a given guest operating system (e.g., Virtual CPU/ABI, Virtual chipset ABI, set of virtual devices, set of physical devices, and/or firmware, etc., assigned to a given guest operating system 300 and/or guest virtual machine protection domain 200). Some systems and methods herein utilizing such virtualization assistance layer may include or involve (but are not strictly limited to) a self-assisted virtualization component, e.g., with an illustrative implementation shown in FIG. 2D.

The guest operating system 300 and the virtualization assistance layer 400 (which may include rootkit defense mechanism(s) 500) are isolated from each other by the separation kernel hypervisor 100. In implementations herein, the guest operating system 300 cannot tamper with, bypass, or corrupt the virtualization assistance layer 400, nor can it tamper with, bypass or corrupt the rootkit defense mechanisms 500. Since the rootkit defense mechanisms 500 are isolated from the guest operating system 300, the rootkit defense mechanisms 500 are able to act on a portion of (or the entirety, depending on policy and configuration) of the guest operating system 300 and its assigned resources in a manner that is (a) is transparent to the guest operating system 300 and (b) not able to be tampered with by the guest operating system 300 or its assigned resources (e.g., errant and/or malicious device DMA originated by devices assigned to the guest operating system 300), and (c) not able to be bypassed by the guest operating system 300. For example, the rootkit defense mechanisms 500, within the given virtualization assistance layer 400, may read and/or modify portions of the guest operating system 300 and resources to which the Guest Operating System 300 has been granted access (by the Separation Kernel Hypervisor 100), while none of the Guest Operating System 300 nor the resources to which has access may modify any portion of the rootkit defense mechanisms 500 and/or virtualization assistance layer 400.

By having a given virtualization assistance layer 400 and a given Guest Operating System 300 within the within the same Guest Virtual Machine Protection Domain 200, isolated from each other by the Separation Kernel Hypervisor 100, various benefits, non-penalties, or mitigation of penalties, such as the following, may be conferred to the system at large and to the rootkit defense mechanisms 500:

1. Increased spatial and temporal locality of data. By being contained within the same Guest Virtual Machine Protection Domain 300, the virtualization assistance layer 200, and/or corresponding private (local) rootkit defense mechanisms 500 existing in that same Guest Virtual Machine Protection Domain 300, have greater access, such as in time and space, to the resources of the Guest Operating System 300 than would entities in other guest virtual machine protection domains or other Guest Operating Systems; e.g., the subject guest virtual machine protection domain has faster responsiveness and/or has lower latency than if processed in another guest virtual machine protection domain. Though such resources are still accessed in a manner that is ultimately constrained by the Separation Kernel Hypervisor 100, there is less indirection and time/latency consumed in accessing the resources:

In one illustrative case, the rootkit defense mechanisms 500 private (local) to a given Guest virtualization assistance layer 200 and its associated Guest Operating System 300 can react faster to rootkit/malware issues, and not need to wait on actions from another entity in another guest virtual machine protection domain 200 or guest operating system 300 (which may themselves have high latency, be corrupted, unavailable, poorly scheduled, or subject to a lack of determinism and/or resource constraint, or improper policy configuration, etc.).

Here, for example, if a Guest Operating System 300 was to monitor a Guest Operating System 399 located within another Guest Virtual Machine Protection Domain 107, it would encounter penalties in time and space for accessing that Guest Operating System and its resources; furthermore, there is increased code, data, scheduling, and/or security policy complexity to establish and maintain such a more complex system; such increases in complexity and resources allow for more bugs in the implementation, configuration, and/or security policy establishment and maintenance.

2. Scalability and Parallelism. Each Guest Operating System 300 may have a virtualization assistance layer 200, and rootkit defense mechanisms 400, that are private (local) to the Guest Virtual Machine Protection Domain 200 that contains both that Guest Operating System 300, the virtualization assistance layer 400, and the rootkit defense mechanisms.

3. Fault isolation, low level of privilege, defense in depth, locality of security policy, and constraint of resource access. Here, for example, relative to the extremely high level of privilege of the separation kernel hypervisor 100, the virtualization assistance layer 400, the rootkit defense mechanism 500, and the Guest Operating System 300 within the same Guest Virtual Machine Protection Domain 200 are only able to act on portions of that Guest Virtual Machine Protection Domain 200 (subject to the Separation Kernel Hypervisor 100) and not portions of other Guest Virtual Machine Protection Domains (nor their contained or assigned resources).

Subject to the isolation guarantees provided by the Separation Kernel Hypervisor 100, the virtualization assistance layer 400 accesses only the resources of the Guest Operating System 300 within the same Guest Virtual Machine Protection Domain 200 and that virtualization assistance layer 400 is not able to access the resources of other Guest Operating Systems.

As such, if there is corruption (bugs, programmatic errors, malicious code, code and/or data corruption, or other faults, etc.) within a given Guest Virtual Machine Protection Domain 200 they are isolated to that Guest Virtual Machine Protection Domain 200. They do not affect other Guest Virtual Machine Protection Domains 299 nor do they affect the Separation Kernel Hypervisor 100. This allows the Separation Kernel Hypervisor to act upon (e.g., instantiate, maintain, monitor, create/destroy, suspend, restart, refresh, backup/restore, patch/fix, import/export etc.) a plurality of Guest Virtual Machine Protection Domains 200 and their corresponding virtualization assistance layer 400 and rootkit defense mechanisms 500 (or even Guest Operating Systems 300) without corruption of the most privileged execution context of the system, the Separation Kernel Hypervisor 100.

Similarly, the faults that may occur within a virtualization assistance layer 400 or the rootkit defense mechanisms 500 (e.g., by corruption of software during delivery) are contained to the Guest Virtual Machine Protection Domain 200 and do not corrupt any other Guest Virtual Machine Protection Domain; nor do they corrupt the Separation Kernel Hypervisor 100.

Furthermore, the faults within a Guest Operating System 300 are contained to that Guest Operating System 300, and do not corrupt either the virtualization assistance layer 400 or the rootkit defense mechanisms 500.

Figure 2B:
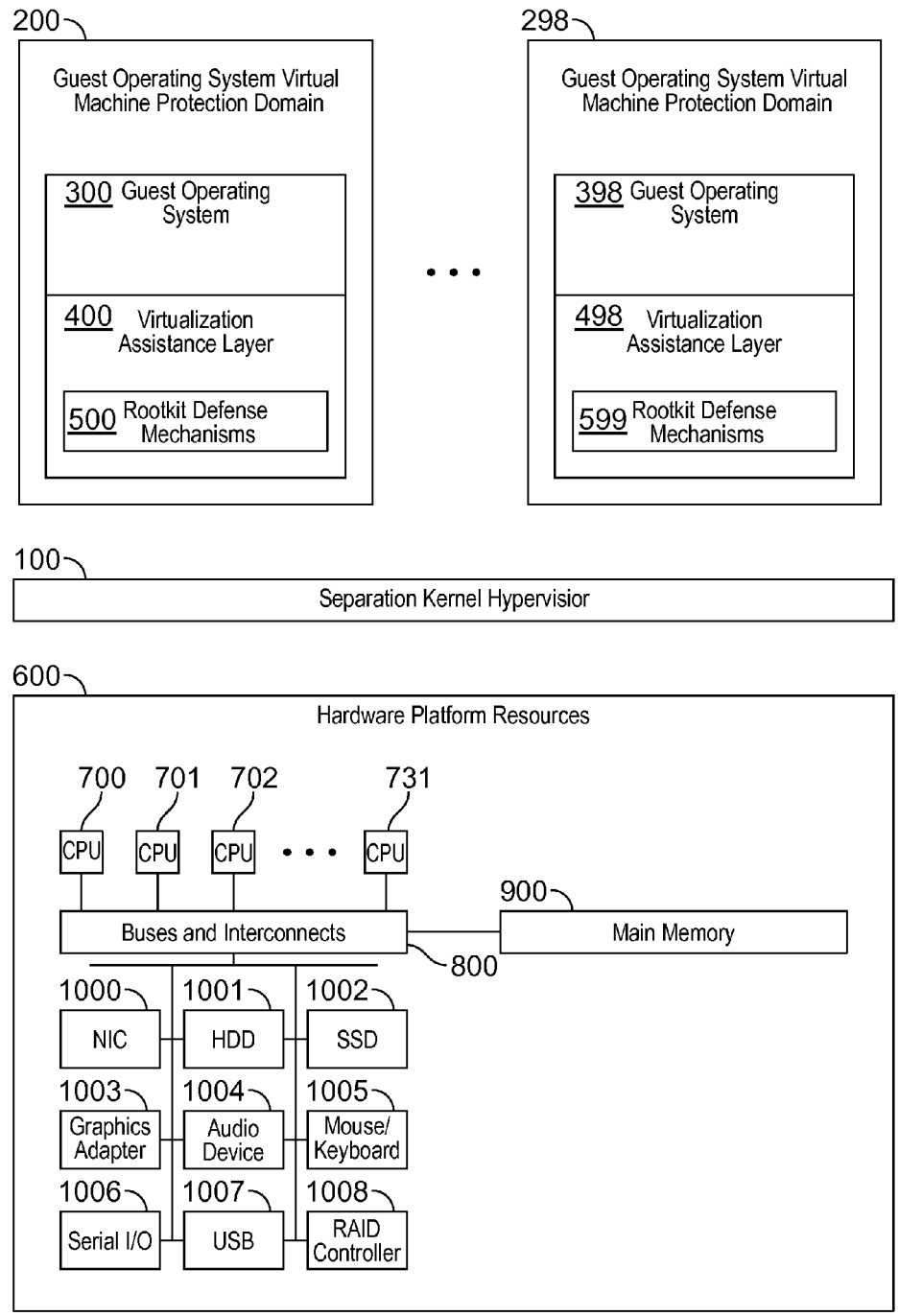
FIG. 2B is a block diagram illustrating an exemplary system and Separation Kernel Hypervisor architecture consistent with certain aspects related to the innovations herein.

FIG. 2B is a block diagram illustrating an exemplary system and separation kernel hypervisor architecture consistent with certain aspects related to the innovations herein. FIG. 2B illustrates a variation of FIG. 2A where a minimal runtime environment 398 executes in place of a (larger/more complex) guest operating system. Here, a minimal runtime environment may be an environment such as a VDS (virtual device server), and/or a LSA (LynxSecure application), etc. The minimal runtime environment 398 can be used for policy enforcement related to activities reported by a virtualization assistance layer and/or rootkit defense mechanisms; such an environment is also monitored by a virtualization assistance layer and/or rootkit defense mechanisms private to the guest operating system virtual machine protection domain containing the minimal runtime environment.

Figure 2C:
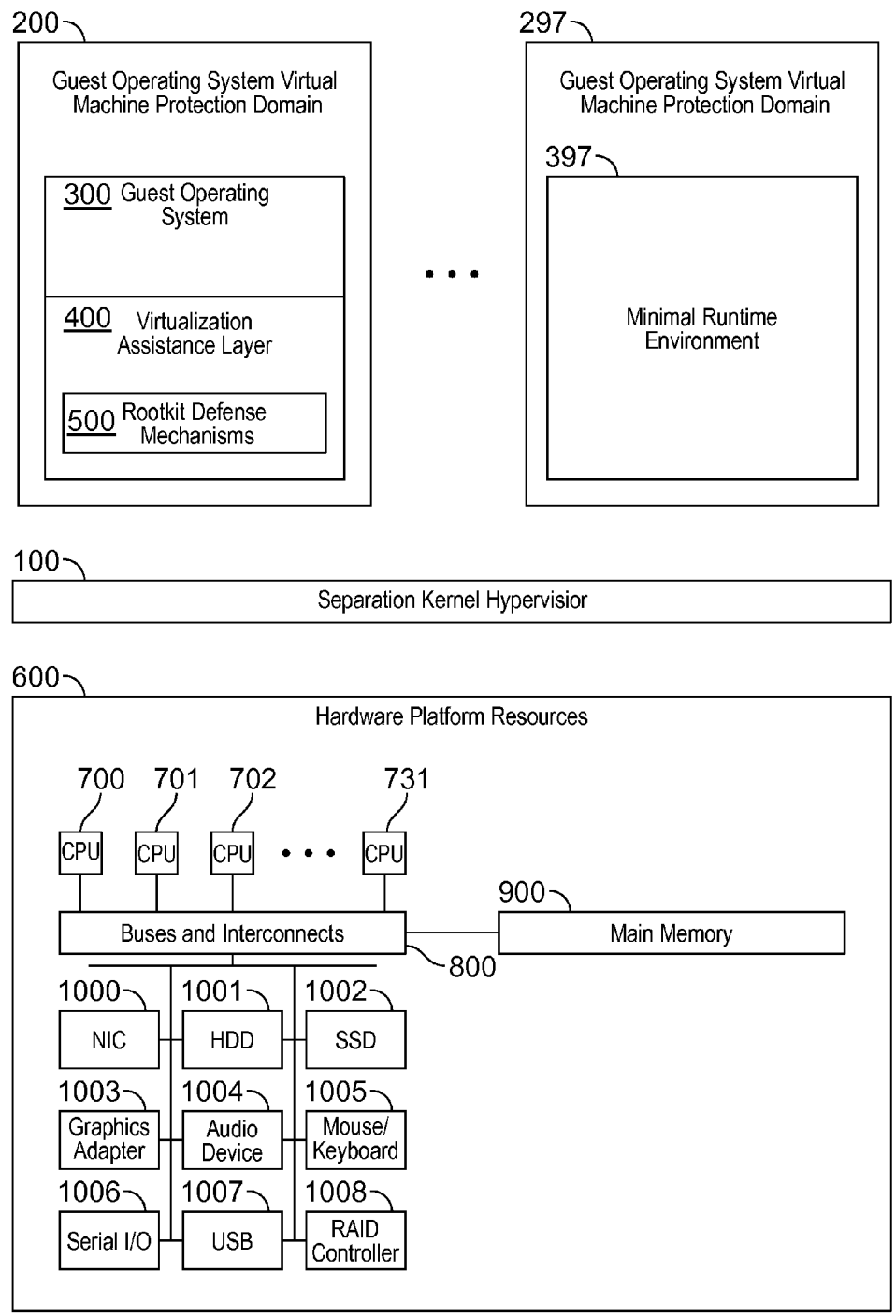
FIG. 2C is a block diagram illustrating an exemplary system and Separation Kernel Hypervisor architecture consistent with certain aspects related to the innovations herein.

FIG. 2C is a block diagram illustrating an exemplary system and separation kernel hypervisor architecture consistent with certain aspects related to the innovations herein. FIG. 2C illustrates a variation of FIG. 2A and FIG. 2B where a minimal runtime environment executes in place of a (larger/more complex) guest operating system but without a virtualization assistance layer or rootkit defense mechanisms.

Figure 2D:
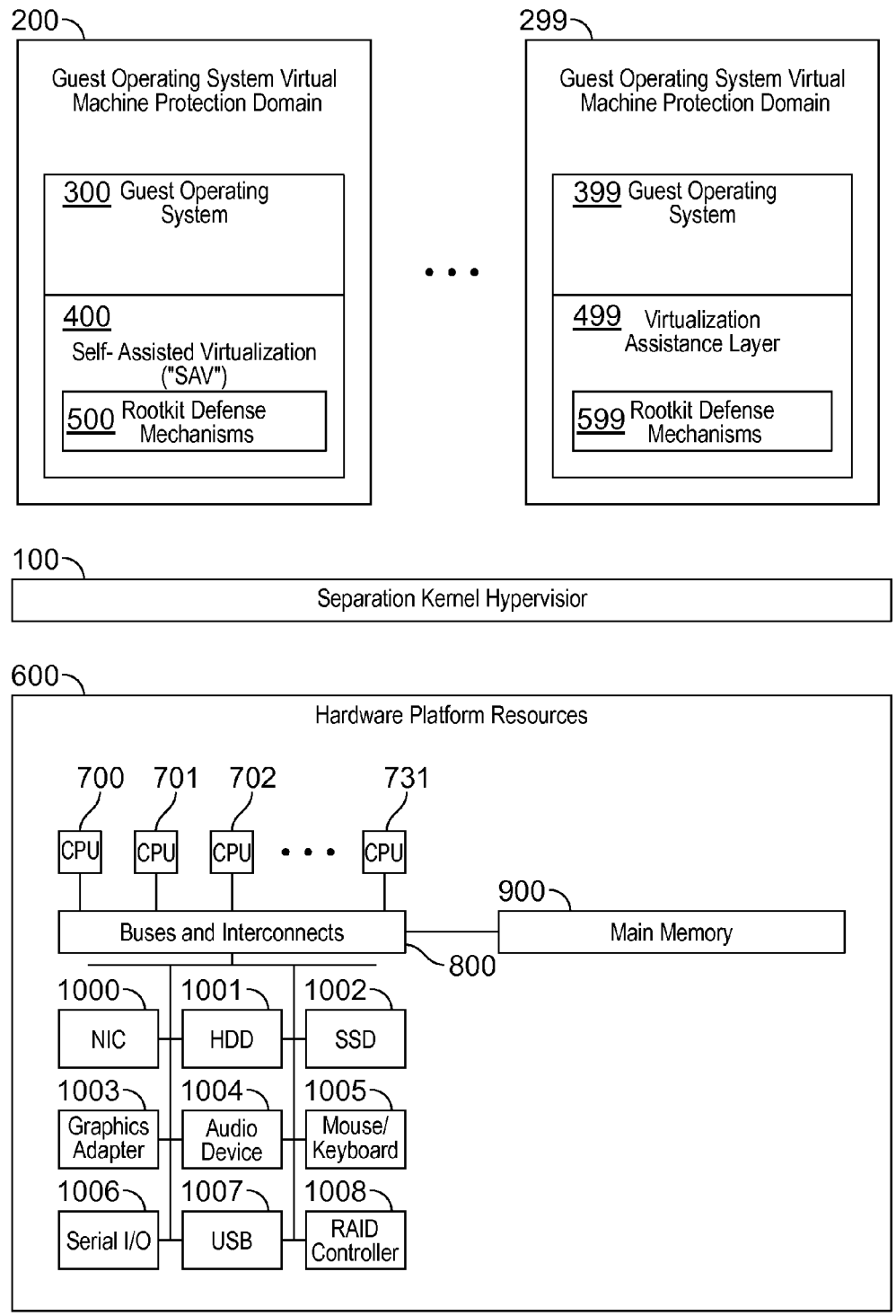
FIG. 2D is a block diagram illustrating an exemplary system and Separation Kernel Hypervisor architecture consistent with certain aspects related to the innovations herein.

FIG. 2D is a block diagram illustrating an exemplary system and Separation Kernel Hypervisor architecture consistent with certain aspects related to the innovations herein. FIG. 2D illustrates a variation of FIG. 2 where a Self-Assisted Virtualization (SAV) mechanism is used to implement the virtualization assistance layer.

Figure 3:
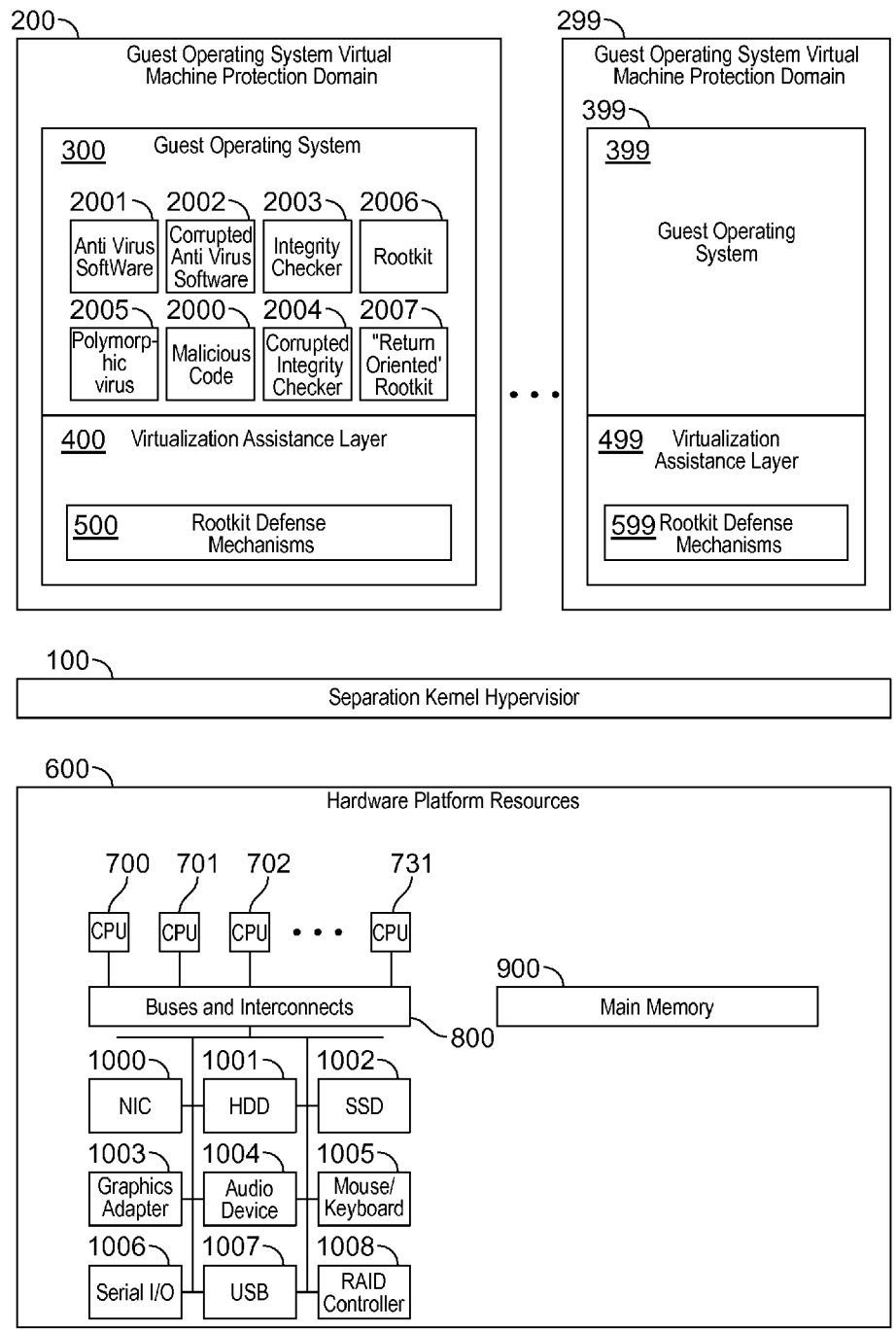
FIG. 3 is a block diagram illustrating an exemplary system and separation kernel Hypervisor architecture consistent with certain aspects related to the innovations herein.

FIG. 3 is a block diagram illustrating an exemplary system and separation kernel Hypervisor architecture consistent with certain aspects related to the innovations herein. FIG. 3 also shows certain detailed aspects with respect to FIGS. 2A/B, where the guest operating system may have a plurality of code and/or data which may constitute execution contexts which may include the following types of software including any/all of which malicious code may attempt to corrupt or utilize: malicious code, anti-virus software, corrupted anti-virus software, integrity checkers, corrupted integrity checkers, rootkits, return oriented rootkits, etc.

For example, in FIG. 3, if antivirus software 2001 executes within a given guest operating system 300, and such anti-virus software 2001 is itself corrupted, and itself executes malicious code 2002 or fails to prevent the execution of malicious code 2002, the corruption is constrained to the given guest operating system 300, and the corruption may be acted upon (e.g., detected, prevented, mitigated, reported, tracked, modified/patched, suspended, halted, restarted, eradicated, etc.) by the rootkit defense mechanisms 500 within the same guest virtual machine protection domain 200 as the guest operating system 300.

With regard to other exemplary implementations, as may be appreciated in connection with FIG. 3, if an integrity checker 2003 (e.g., a "security" component or driver within a guest operating system 300) executes within a given guest operating system 300, and such integrity checker 2003 is itself corrupted into a corrupted integrity checker 2004 (and executes malicious code, or fails to prevent the execution of malicious code), the corruption is constrained to the given guest operating system 300, and the corruption may be acted upon (e.g., detected, prevented, mitigated, reported, tracked, modified/patched, suspended, halted, restarted, eradicated, etc.) by the rootkit defense mechanisms 500 within the same guest virtual machine protection domain 200 as the guest operating system 300.

With regard to another illustration, again with reference to FIG. 3, if a rootkit 2006 executes within the guest operating system 300 (e.g., by having fooled the Integrity Checker 2003 by the nature of the root kit being a return oriented rootkit 2007, which are designed specifically to defeat integrity checkers) the corruption is constrained to the given guest operating system 300, and the corruption may be acted upon (e.g., detected, prevented, mitigated, reported, tracked, modified/patched, suspended, halted, restarted, eradicated, etc.) by the rootkit defense mechanisms 500 within the same guest virtual machine protection domain 200 as the guest operating system 300.

In another example, again with respect to FIG. 3, if a polymorphic virus 2005 (an entity designed to defeat integrity checkers, among other things) executes within the guest operating system 300 (e.g., by having fooled the integrity checker 2003, or by having the a corrupted integrity checker 2003) the corruption is constrained to the given guest operating system 300, and the corruption may be acted upon (e.g., detected, prevented, mitigated, reported, tracked, modified/patched, suspended, halted, restarted, eradicated, etc.) by the rootkit defense mechanisms 500 within the same guest virtual machine protection domain 200 as the guest operating system 300.

In general, referring to FIG. 3, if a malicious code 2000 executes within the guest operating system 300 (e.g., by means including, but not limited strictly to bugs, defects, bad patches, code and/or data corruption, failed integrity checkers, poor security policy, root kits, viruses, trojans, polymorphic viruses, and/or other attack vectors and/or sources of instability within the guest operating system 300 etc.), the corruption is constrained to the given guest operating system 300, and the corruption may be acted upon (e.g., detected, prevented, mitigated, reported, tracked, modified/patched, suspended, halted, restarted, eradicated, etc.) by the rootkit defense mechanisms 500 within the same guest virtual machine protection domain 200 as the guest operating system 300.

Furthermore, in the examples above and other cases, such corruption of the guest operating system 300, and the resources to which it has access, do not corrupt the rootkit defense mechanisms 500, the virtualization assistance layer 400, the guest virtual machine protection domain 200, or plurality of other such resources in the system (e.g., other guest virtual machine protection domains 299), or the separation kernel hypervisor 100.

In some implementations, the rootkit defense mechanisms 500, in conjunction with the virtualization assistance layer 400, and the separation kernel hypervisor 100, may utilize various methods and mechanisms such as the following, given by way of illustration and example but not limitation, to act with and upon its associated guest operating system 300 the resources assigned to the guest operating system 300, and the systems behavior generated thereto and/or thereby.

Figure 4:
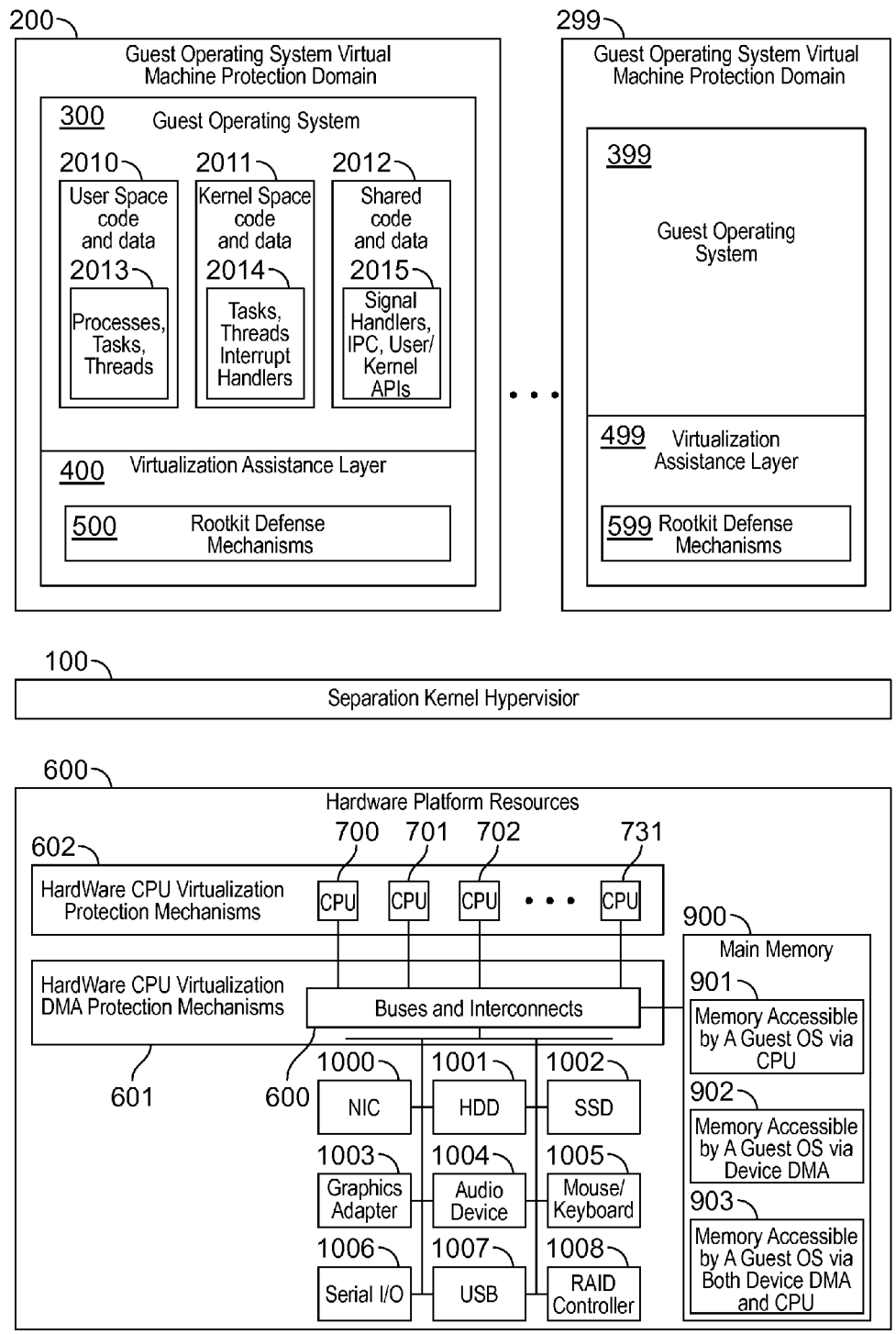
FIG. 4 is a block diagram illustrating an exemplary system and separation kernel hypervisor architecture consistent with certain aspects related to the innovations herein.

FIG. 4 is a block diagram illustrating an exemplary system and separation kernel hypervisor architecture consistent with certain aspects related to the innovations herein. For example, FIG. 4 illustrates resources that may be assigned to a Guest Operating System 300 consistent with certain aspects related to the innovations herein.

FIG. 4 shows an illustrative extension of either FIG. 2, and/or FIG. 3, where the guest operating system may have a plurality of code and/or data which may constitute execution contexts which may include the following types of software mechanisms and/or constructs (any/all of which malicious code may attempt to corrupt or utilize): user space code and data that may be associated with an unprivileged mode of CPU execution (as used herein 'user space' being an execution environment of low privilege, versus an execution environment of high privilege, such as kernel space), which may contain processes, tasks, and/or threads, etc.; kernel space code and data, that may be associated with a privileged mode of CPU execution, which may contain tasks, threads, interrupt handlers, drivers, etc.; shared code and data, that may be associated with either privileged and/or unprivileged modes of CPU execution, and which may include signal handlers, Inter Process Communication Mechanisms (IPC), and/or user/kernel mode APIs. It also may include main memory that may be accessed by the CPU, by DMA from devices, or both. It also shows protection mechanisms including hardware CPU virtualization protection mechanisms, and hardware virtualization DMA protection mechanisms.

Such resources, explained here by way of example, not limitation, may include a subset of (a) hardware platform resources 600, virtualized hardware platform resources (hardware platform resources 600 subject to further constraint by the separation kernel hypervisor 100, the hardware CPU virtualization protection mechanisms 602, and/or the hardware virtualization DMA protection mechanisms 601), and execution time on a CPU 700 (or a plurality of CPUs, e.g., 700 to 731) (scheduling time provided by the separation kernel hypervisor 100), and space (memory 900 provided by the separation kernel hypervisor) within which the guest operating system 300 may instantiate and utilize constructs of the particular guest operating system 300, such as a privileged ("kernel" space) modes of execution, non-privileged ("user" space) modes of execution, code and data for each such mode of execution (e.g., processes, tasks, threads, interrupt handlers, drivers, signal handlers, inter process communication mechanisms, shared memory, shared APIs between such entities/contexts/modes, etc.); all of which guest operating system 300 constructs may be susceptible or corruptible by malicious code.

Figure 5:
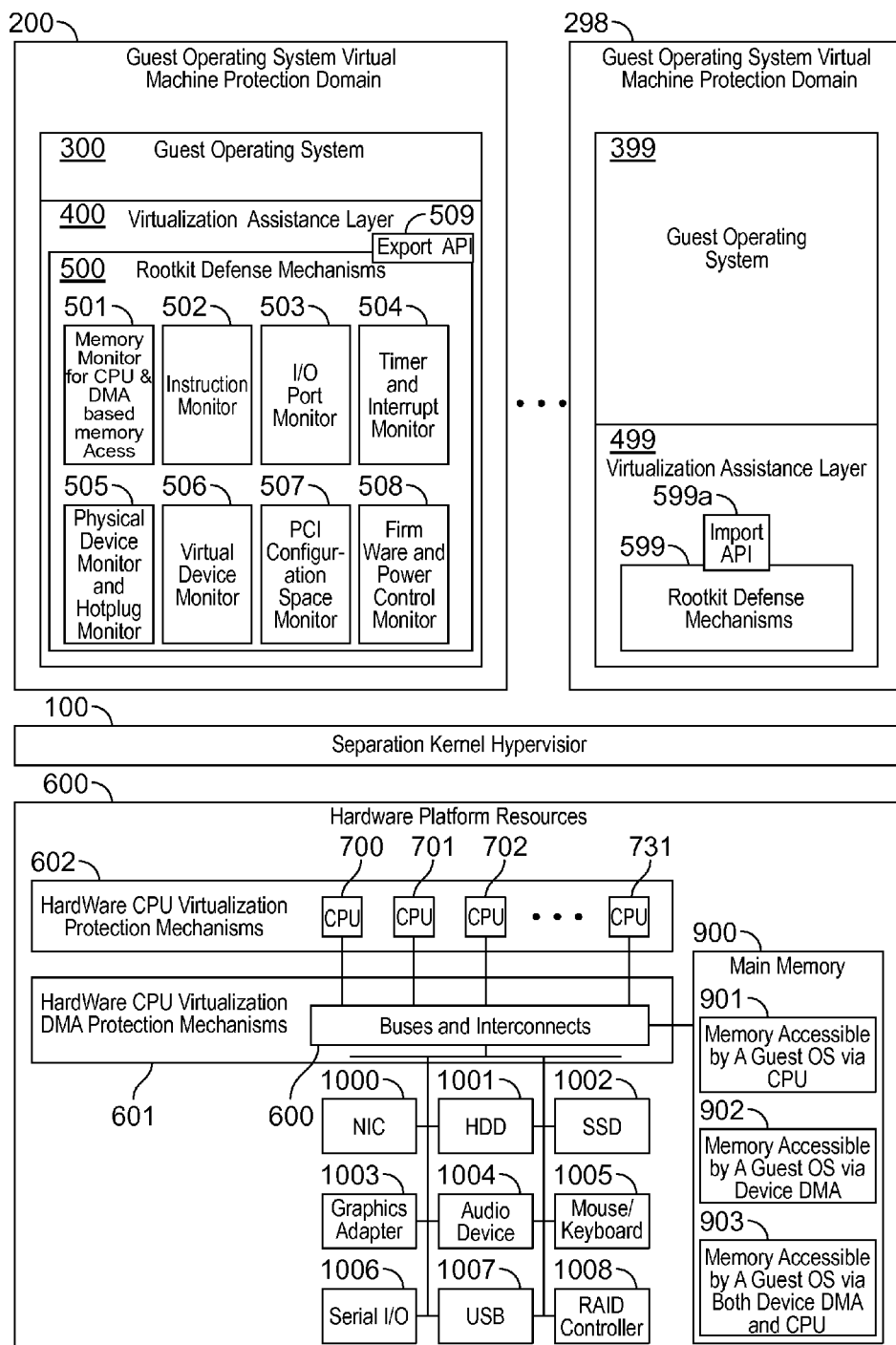
FIG. 5 is a block diagram illustrating an exemplary system and separation kernel hypervisor architecture consistent with certain aspects related to the innovations herein.

FIG. 5 is a block diagram illustrating an exemplary system and separation kernel hypervisor architecture consistent with certain aspects related to the innovations herein. FIG. 5 shows an illustrative implementation as may be associated with FIG. 2, FIG. 3, and/or FIG. 4, where the rootkit defense mechanisms, that may be within the virtualization assistance layer, may include the following monitoring systems and mechanisms: memory monitor for CPU & DMA based memory access (or any combination of access thereof), an instruction monitor, an I/O Port Monitor, a timer & interrupt monitor, a physical device monitor & hotplug monitor, a virtual device monitor, a PCI configuration space monitor, and/or a firmware & power control monitor, etc. FIG. 5 also illustrates import/export mechanism that may be used by a virtualization assistance layer and/or rootkit defense mechanisms to communicate between themselves and other virtualization assistance layer and/or rootkit defense mechanisms in other guest operating system virtual machine protection domains (subject to the security policies established, maintained, and enforced by the separation kernel hypervisor), in an isolated, secure, and even monitored fashion.

FIG. 5 illustrates mechanism and resources that may be used by the rootkit defense mechanisms 500 to monitor a guest operating system 300. Such mechanisms and resources may include a memory monitor 501 (for CPU & DMA based memory access), an instruction monitor 502, an I/O port monitor 503, a timer & interrupt monitor 504, a physical device & hotplug monitor 505, a virtual device monitor 506, a PCI configuration space monitor 507, and a firmware and power Control Monitor 508.

The virtualization assistance layer 400 and/or the rootkit defense mechanisms 500 may also use an export API 509 and/or an import API 599 (as may be configured and governed by the separation kernel hypervisor 100), in order to provide secure communication between a plurality of virtualization assistance layers (e.g., virtualization assistance layers 400 to 499) and/or a plurality of rootkit defense mechanisms (e.g., rootkit defense mechanisms 500 to 599).

Systems and mechanisms, and example embodiments, of the rootkit defense mechanisms 500 may include:

1. Monitoring of CPU (and CPU cache based) guest OS memory access (originated from a plurality of resources available to the guest operating system 300 (in FIGS. 3 and 4), including CPUs and/or caches assigned and/or associated with such), as directed by execution and resources (shown in FIG. 3) within the guest OS 300. For memory assigned to the guest OS 300, such as a subset of the main memory 900 (in FIGS. 2, 3, 4, and 5) the separation kernel hypervisor 100 may trap access to that memory, and then pass associated data of that trap to the virtualization assistance layer 400. The virtualization assistance layer 400 may then pass the associated data of that trap to the rootkit defense mechanisms 500.

The virtualization assistance layer 400 and/or the rootkit defense mechanisms 500 may also poll on memory regions to which the guest operating system 300 has access. For example, independent of any trapping behavior, where the separation kernel hypervisor 100 transitions execution to the virtualization assistance layer 400 and/or the rootkit defense mechanisms for other reasons (not trapping reasons necessarily), the virtualization assistance layer 400 and/or the rootkit defense mechanisms 500 may periodically check certain memory regions of the guest operating system 300.

The virtualization assistance layer 400, rootkit defense mechanisms 500, and/or the separation kernel hypervisor 100 may use feedback mechanisms between themselves to recognize and monitor patterns of guest operating system 300 memory access; not strictly one-off memory access attempts.

The monitoring of guest operating system 300 memory access includes, but it not limited to, constructs in guest operating system 300 memory which may have semantics specific to a particular CPU, processor ABI, architecture (or micro-architecture). For example, the Interrupt Descriptor Table ("IDT"), the Global Descriptor Table ("GDT"), or Local Descriptor Table(s) ("LDT(s)") on a modern Intel IA32e platform; any of which may be targeted by malicious code (from FIG. 3) and/or entities within the guest OS (from FIG. 4).

The monitoring of guest operating system 300 memory access includes, but is not limited to, constructs in guest operating system 300 memory (including the resources in the guest operating system 300 in FIGS. 3 and 4) which may have semantics specific to a particular guest operating system 300 or a set of applications hosted by the guest operating system 300 (possibly including antivirus software).

Figure 6A:
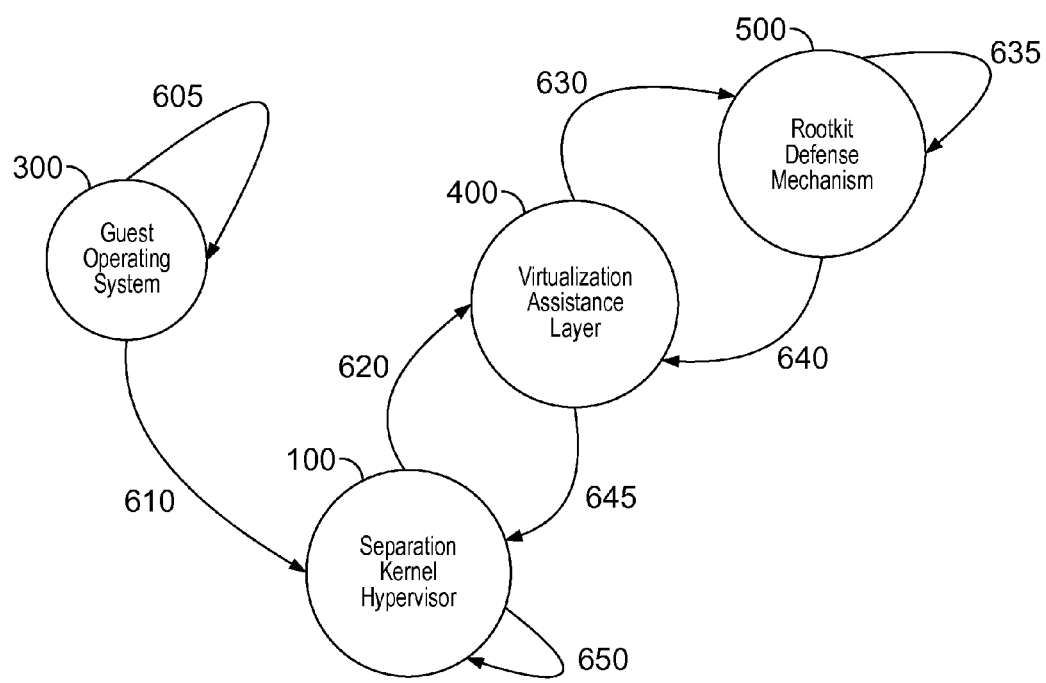
FIGS. 6A-6B are representative sequence/flow diagrams illustrating exemplary systems, methods and separation kernel hypervisor architecture consistent with certain aspects related to the innovations herein.
Figure 6B:
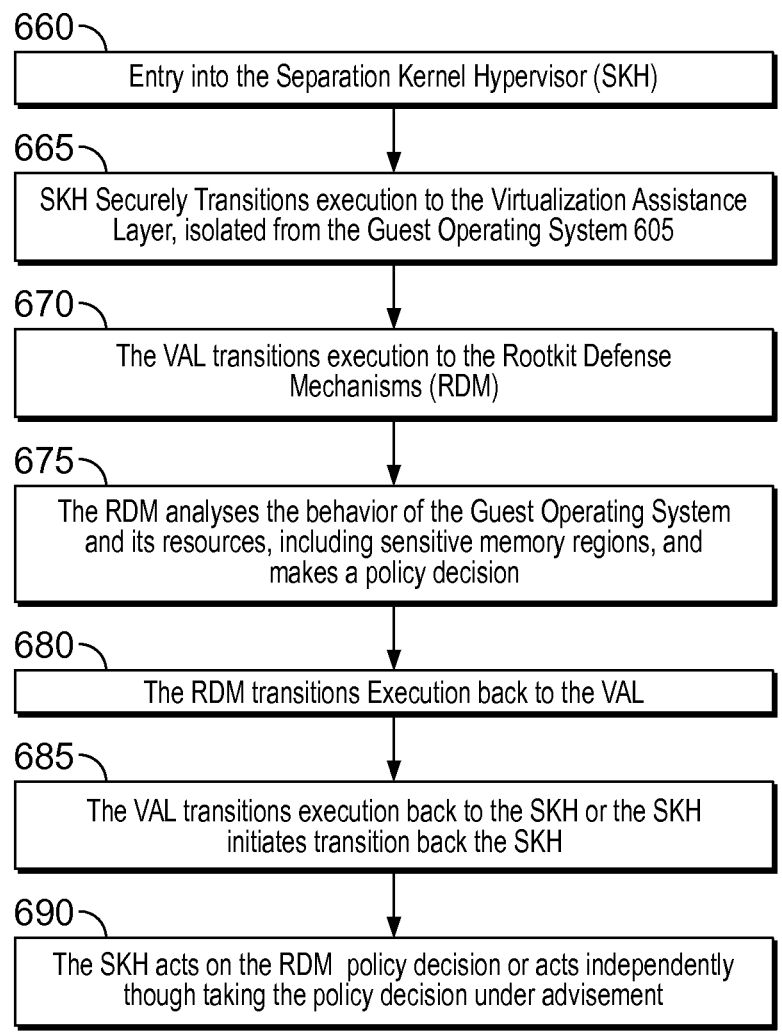

Illustrative implementations relating to the above are shown in FIGS. 6A-6B.

2. Monitoring of Guest Operating System 300 I/O port access. For all I/O ports assigned to the Guest Operating System 300, the SKH 100 may trap access to the I/O ports, and then pass associated data of that trap to the virtualization assistance layer 400 and/or the rootkit defense mechanisms 500.

The virtualization assistance layer 400, rootkit defense mechanisms 500, and/or the Separation Kernel Hypervisor 100 may use feedback mechanisms between themselves to recognize and monitor patterns of Guest Operating System 300 I/O ports access; not strictly one-off memory access attempts.

Figure 10A:
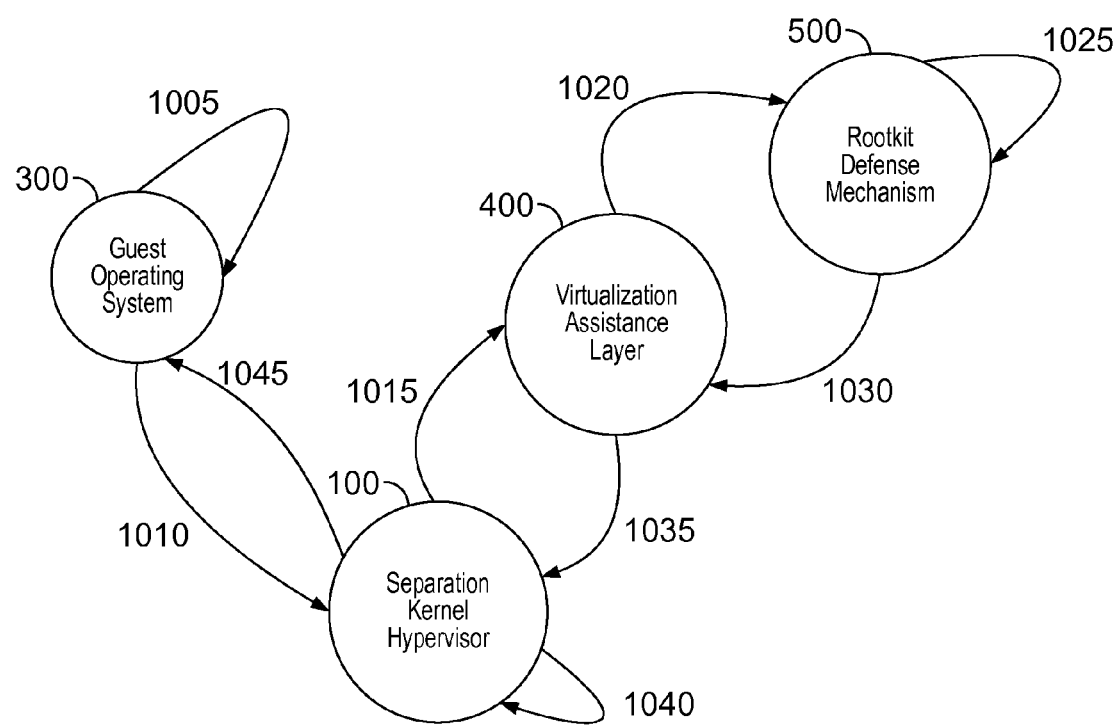
FIGS. 10A-10B are representative sequence/flow diagrams illustrating exemplary systems, methods, and separation kernel hypervisor architecture consistent with certain aspects related to the innovations herein.
Figure 10B:
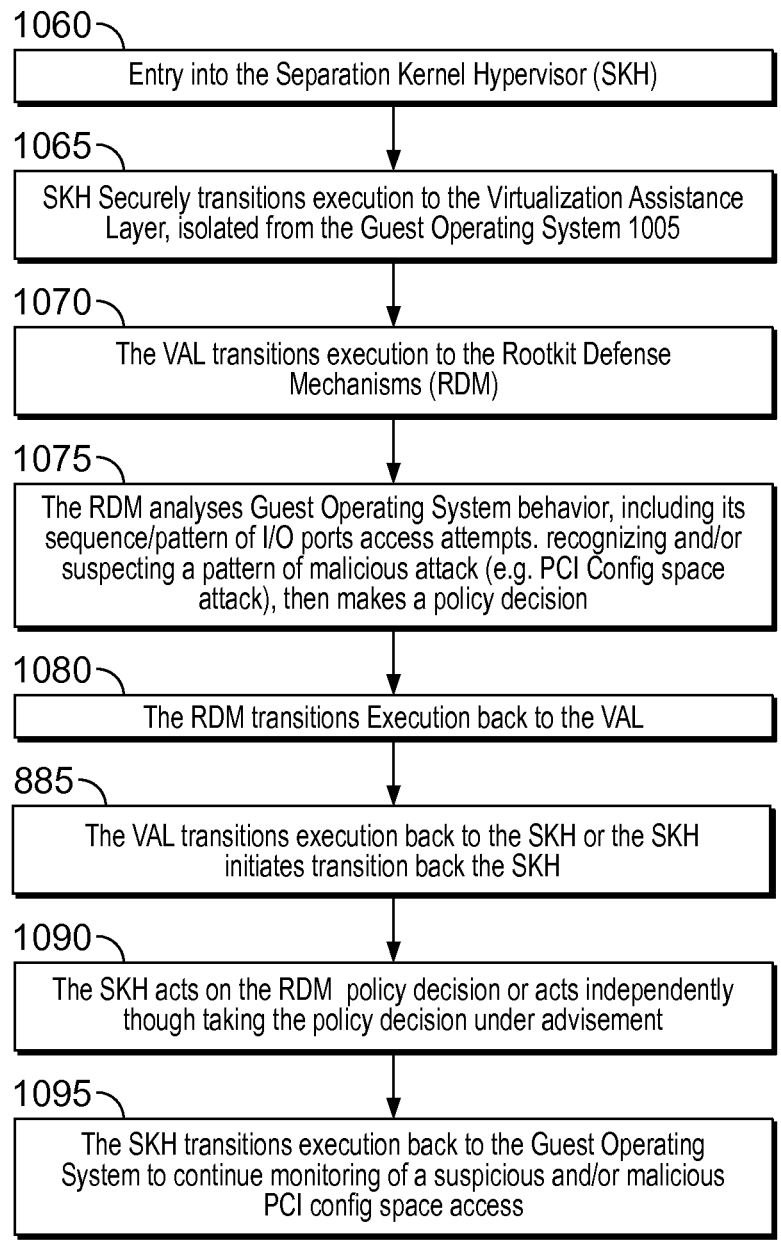

Illustrative aspects, here, are shown in FIGS. 10A-10B.

3. Monitoring of Guest Operating System 300 PCI configuration space access. For all PCI configuration space access, whether by I/O port and/or memory mapped I/O the Separation Kernel Hypervisor 100 may trap access to the PCI configuration space, and then pass associated data of that trap to the virtualization assistance layer 400 and/or the rootkit defense mechanisms 500.

The virtualization assistance layer 400, rootkit defense mechanisms 500, and/or the Separation Kernel Hypervisor 100 may use feedback mechanisms between themselves to recognize and monitor patterns of Guest Operating System 300 PCI configuration space access, whether via I/O ports access or memory mapped access; not strictly one-off access attempts.

An illustrative example is shown in FIGS. 10A-10B for I/O port access. For memory mapped access to PCI configuration space the general steps and methods of FIGS. 6A-6B may apply.

4. Monitoring of Guest Operating System 300 virtual device interfaces. For all virtual device (or virtual device ABI) access, whether by I/O port and/or memory mapped I/O, the Separation Kernel Hypervisor 100 may trap access to virtual device (or ABI), then pass associated data of that trap to the virtualization assistance layer 400 and/or rootkit defense mechanisms.

The virtualization assistance layer 400, rootkit defense mechanisms 500, and/or the Separation Kernel Hypervisor 100 may use feedback mechanisms between themselves to recognize and monitor patterns of Guest Operating System 300 virtual device access, whether via I/O ports access or memory mapped access; not strictly one-off access attempts.

Virtual devices include (but are not limited to) CPU and/or platform devices, such as timers, interrupt controllers, network devices, PCI, PCI-E, PCI-X, USB, ATA, SATA, SCSI, graphics devices, audio devices, encryption, key storage, serial devices, etc.

The virtualization assistance layer 400 and/or rootkit defense mechanisms 500 may monitor the interfaces to virtual devices, and/or monitor the "back-end" of virtual devices. In a split device scenario, where the "front-end" of a virtual devices is interfaced by the Guest Operating System 300, and the "back-end" is hidden, inaccessible by the Guest Operating System 300, and maintained by other components of the system, the virtualization assistance layer 400 may monitor one or both of the "front-end" or the "back-end".

For example, with a virtual block device, the Guest Operating System may attempt to read/write the Master Boot Record (or Partition Boot Record), or a set thereof. The virtualization assistance layer 400 and/or rootkit defense mechanisms 500 can intercept such access attempts, while also (independently) monitoring the MBRs (or PBRs) on the virtual disk itself; e.g., to ensure that corruption by other means/interfaces of the MBR/PBRs did not occur.

Figure 8A:
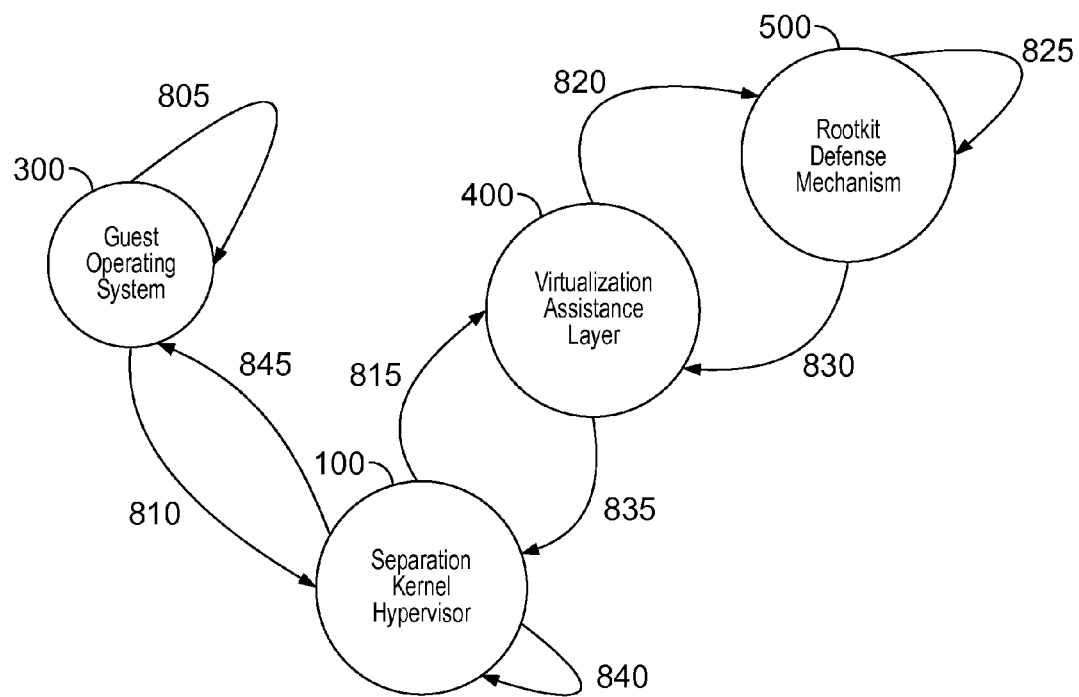
FIGS. 8A-8B are representative sequence/flow diagrams illustrating exemplary systems, methods, and Separation Kernel Hypervisor architecture consistent with certain aspects related to the innovations herein.
Figure 8B:
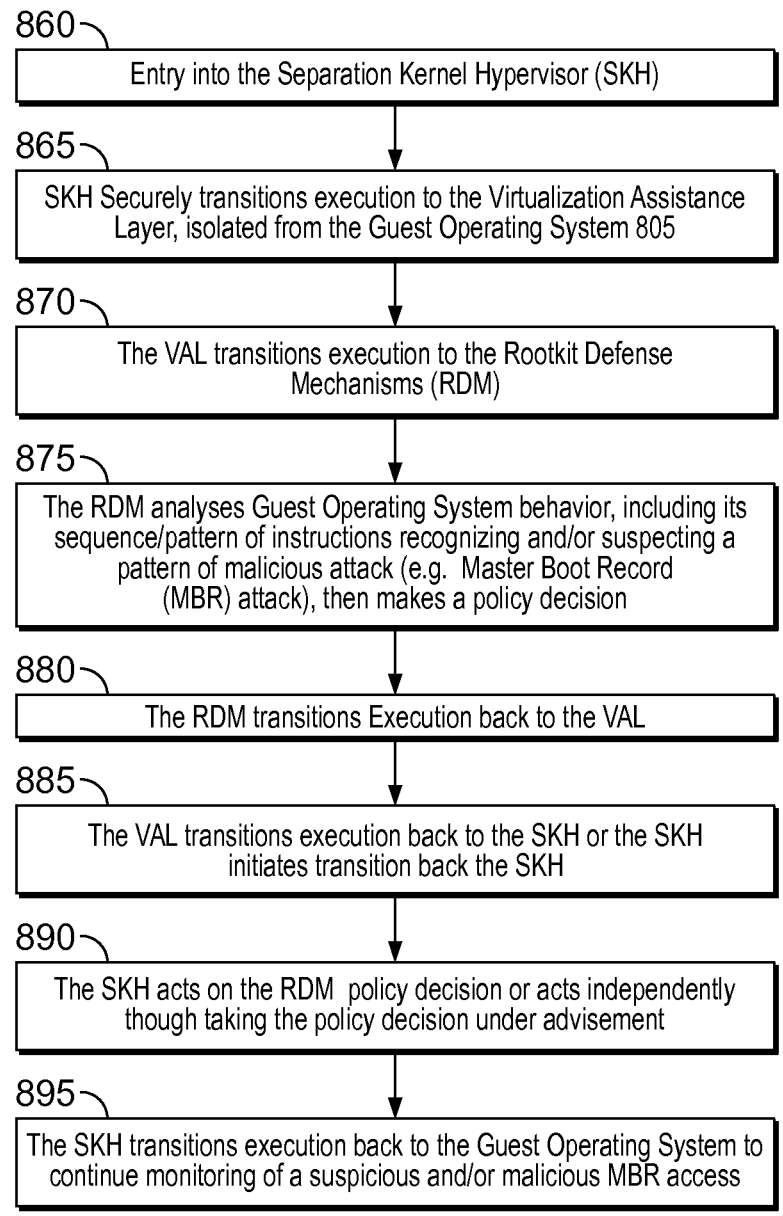

Illustrative aspects, here, are shown in FIGS. 8A-8B.

5. Monitoring of Guest Operating System 300 device interfaces. For all devices (or device ABI) access, whether by I/O port and/or memory mapped I/O, the Separation Kernel Hypervisor 100 may trap access to the device (or ABI), then pass associated data of that trap to the virtualization assistance layer 400 and/or the rootkit defense mechanisms 500.

Devices include (but are not limited to) CPU and/or platform devices, such as timers, interrupt controllers, network devices, PCI, PCI-E, PCI-X, USB, ATA, SATA, SCSI, graphics devices, audio devices, encryption, key storage, serial devices, etc.

The virtualization assistance layer 400, rootkit defense mechanisms 500, and/or the Separation Kernel Hypervisor 100 may use feedback mechanisms between themselves to recognize and monitor patterns of Guest Operating System 300 device access, whether via I/O ports access or memory mapped access; not strictly one-off access attempts.

Illustrative aspects, here, are shown in FIGS. 8A-8B.

6. Monitoring of DMA generated by Guest Operating System 300 devices with DMA engines and/or DMA capability. For all DMA attempts by devices assigned to the Guest Operating System, the Separation Kernel Hypervisor 100 may trap such DMA access attempts, and then pass associated data of that trap to the virtualization assistance layer 400 and/or the rootkit defense mechanisms 500. This applies to all memory assigned to the Guest Operating System 300.

The virtualization assistance layer 400, rootkit defense mechanisms 500, and/or the Separation Kernel Hypervisor 100 may use feedback mechanisms between themselves to recognize and monitor patterns of Guest Operating System 300 DMA access to memory; not strictly one-off access attempts.

Illustrative aspects, here, are shown in FIGS. 6A-6B.

7. Monitoring of Guest Operating System 300 firmware access or access to firmware interfaces. For all firmware interfaces assigned to the Guest Operating System 300 (be they I/O, memory mapped, or DMA access, the Separation Kernel Hypervisor 100 may trap such firmware access attempts, then pass associated data of that trap to the virtualization assistance layer 400 and/or rootkit defense mechanisms 500.

The virtualization assistance layer 400, rootkit defense mechanisms 500, and/or the Separation Kernel Hypervisor 100 may use feedback mechanisms between themselves to recognize and monitor patterns of Guest Operating System 300 firmware interface access, whether via I/O ports access or memory mapped access; not strictly one-off access attempts.

An illustrative example is shown in Sequence Diagram 5 for I/O ports based access. For memory mapped access of firmware interfaces, the general steps and methods involved in FIGS. 6A-6B may apply.

8. Monitoring of specific Guest Operating System 300 instruction execution attempts, and/or specific instruction sequence execution attempts.

For all such attempts by the Guest Operating System 300, the Separation Kernel Hypervisor 100 (when configured to do so, or via feedback receive from the virtualization assistance layer 400 and/or the rootkit defense mechanisms 500) may trap such access attempts, then pass associated data of that trap to the virtualization assistance layer 400 and/or rootkit defense mechanisms 500.

The virtualization assistance layer 400 and/or the rootkit defense mechanisms 500 can respond to such instruction sequences; including, but not limited to, recognition of a significant fraction of a given sequence, then prevent/block the final instructions of the malicious sequence from execution.

For example, for rootkit or other malicious intrusions, including "return oriented rootkits" or "return oriented attacks" which use disjoint sets of code, scattered within a Guest OS (code that is not necessarily linked together; code which is not necessarily even part of a single function, module, driver, or grouped together at all in memory) to jump to and from such code, whereby each jump may encapsulate a specific set of instructions, so as the entirety of such instructions together may result in behavior in the CPU/system that executes arbitrary and/or malicious instructions at high privilege, in a manner that code integrity checkers can not detect (including, but not limited to white lists of "approved" or "signed" code): the virtualization assistance layer 400 and/or rootkit defense mechanisms 500 may be configured to respond to such instruction sequences, recognizing the pattern of attack, and denying all or a portion of the instructions from their originally intended malicious semantics.

Figure 7A:
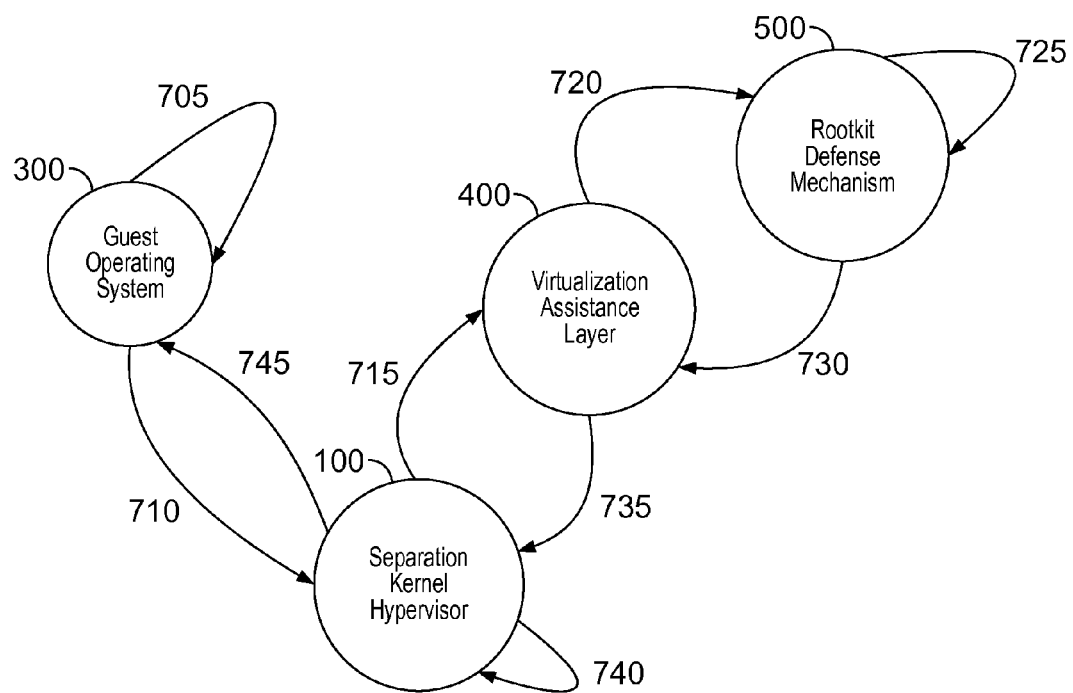
FIGS. 7A-7B are representative sequence/flow diagrams illustrating exemplary systems, methods and separation kernel hypervisor architecture consistent with certain aspects related to the innovations herein.
Figure 7B:
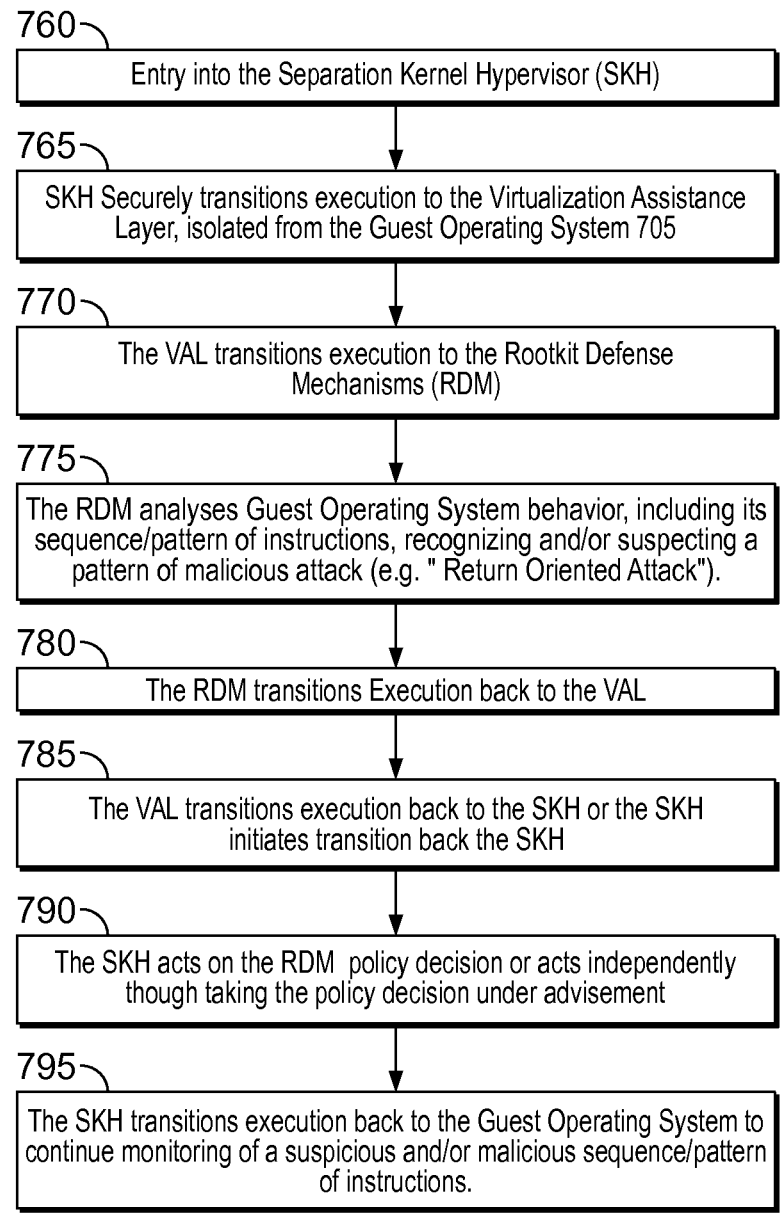

Illustrative aspects, here, are shown in FIGS. 7A-7B.

9. Monitoring of device plug-in or unplugging.

For example, here, USB stick plug-in detection, or storage media hot-swap. The interrupt handler for the USB stick plug-in activity may re-direct Guest Operating System 300 execution to malicious code before other code of the Guest Operating System 300, such as antivirus software or integrity checkers, may have a chance to execute.

Figure 9A:
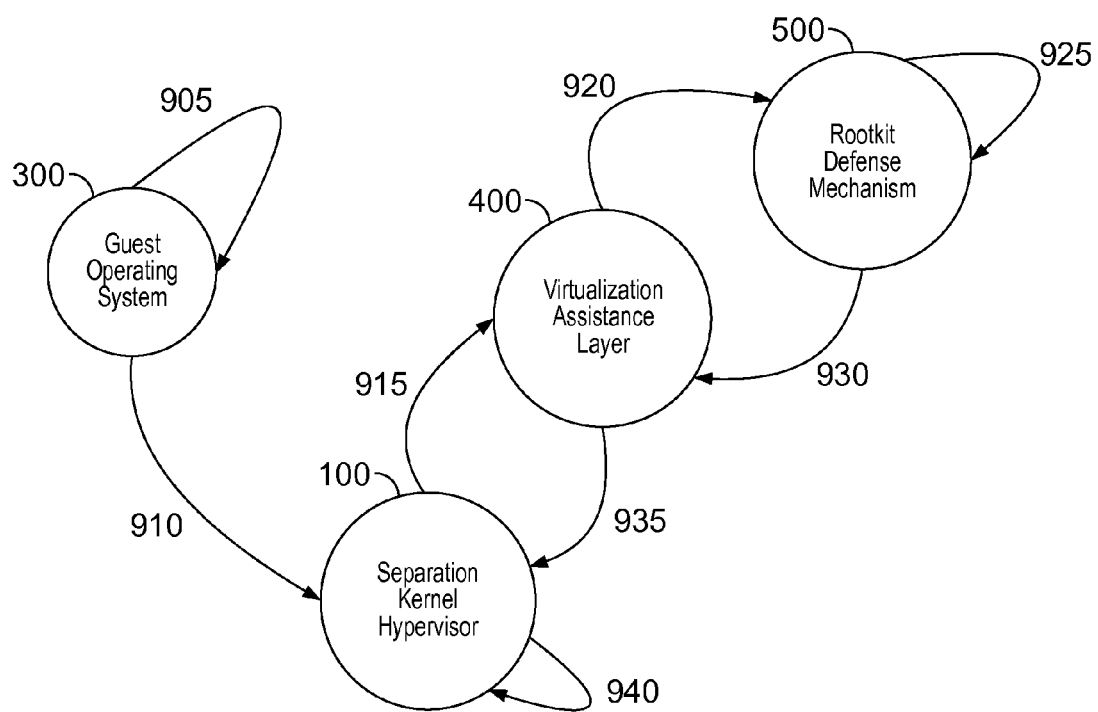
FIGS. 9A-9B are representative sequence/flow diagrams illustrating exemplary systems, methods, and Separation Kernel Hypervisor architecture consistent with certain aspects related to the innovations herein.
Figure 9B:
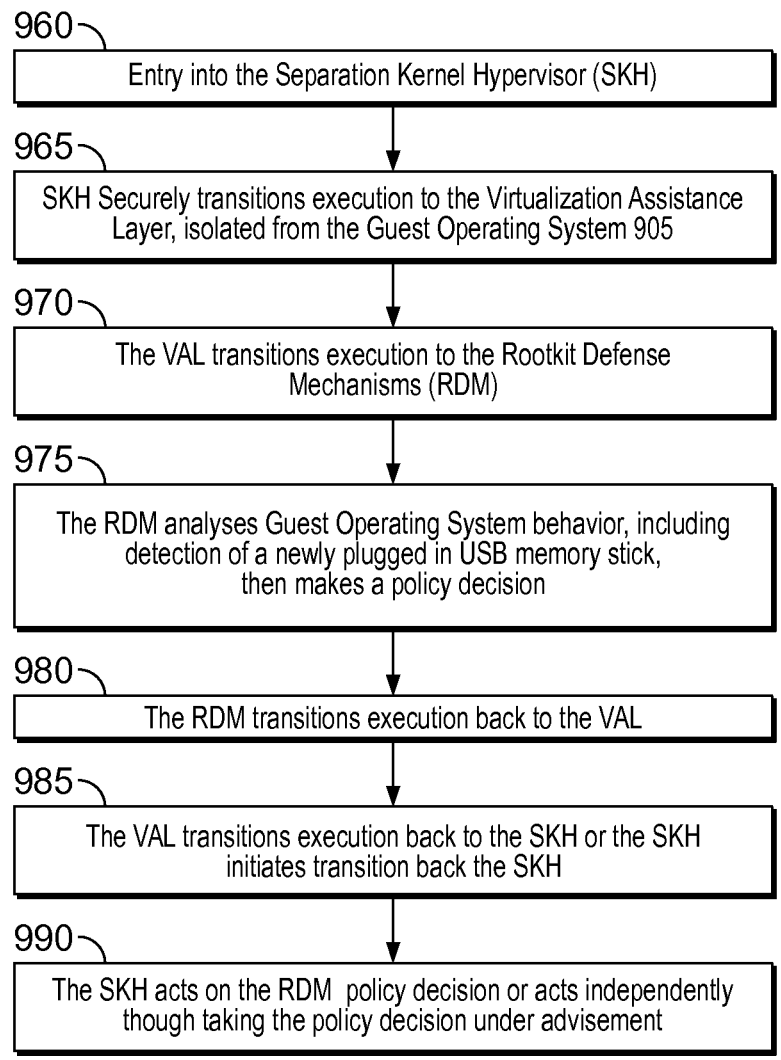

Illustrative aspects, here, are shown in FIGS. 9A-9B.

10. Monitoring of power management, and virtual power management, activities and/or transitions.

For example, here, when a Guest Operating System 300 attempts to hibernate, this triggers detection of the activity, and the Separation Kernel Hypervisor 100, virtualization assistance layer 400, and/or the rootkit defense mechanisms 500 then further monitor the activity; e.g., execution of mechanisms that look for malicious code trying to hide and/or activate during the virtual power transition; the malicious code may try to hook the entry points on virtual power-up; cases where the antivirus software (or code integrity checkers) inside the Guest Operating System 300 are not able to detect such malicious code activity.

An illustrative example is shown in Sequence Diagram 5 for I/O ports based access. For memory mapped access of firmware interfaces, the general steps and methods involved in FIGS. 6A-6B may apply.

FIGS. 6A-6B are representative sequence/flow diagrams illustrating exemplary systems, methods and Separation Kernel Hypervisor architecture consistent with certain aspects related to the innovations herein. FIGS. 6A-6B relate, inter alia, to behavior relating to the handling of guest operating system attempts to access main memory, either via CPU based memory access, and/or DMA based memory access; in this case, malicious code within the guest operating system is attempting to corrupt and/or subvert antivirus software within the guest operating system; and the rootkit defense mechanisms detect/prevent it.

Turning to the illustrative implementations/aspects of FIG. 6A, at step 605 a Guest Operating System executes malicious code. Then, at step 610, malicious code within that Guest Operating System attempts to overwrite the antivirus code in the Guest Operating System; either via (2a) memory access attempts by the CPU, or (2b) memory access attempts via programming a DMA capable device to attempt to access the memory. The memory access attempt (either via CPU or DMA) triggers entry into the Separation Kernel Hypervisor. Then, at step 620, The Separation Kernel Hypervisor securely transitions execution to the virtualization assistance layer; in a manner isolated from the Guest Operating System. Next, in step 630 the virtualization assistance layer transitions execution to the rootkit defense mechanisms. Then, at step 635 the rootkit defense mechanisms analyze the behavior of the Guest Operating System and its resources and makes a policy decision; in this example, it has been configured to understand the memory locations which are sensitive (contain the antivirus code locations), thus decides to deny the malicious memory access attempt. Next, at step 640 the rootkit defense mechanisms transition execution to the virtualization assistance layer, passing it the policy decision. Then, at step 645 the virtualization assistance layer transitions execution back to the Separation Kernel Hypervisor, or the Separation Kernel Hypervisor transitions execution from the virtualization assistance layer back to the Separation Kernel Hypervisor. Next, at step 650 the Separation Kernel Hypervisor acts on the policy decision generated by the rootkit defense mechanisms (in this example it denies the malicious attempt to modify the antivirus code), or the Separation Kernel Hypervisor acts independently of the policy decision, but in a manner that takes the policy decision under advisement (depending on configuration). The SKH may receive, analyze, and/or act upon policy decisions from multiple sources, which may include multiple rootkit defense mechanisms (RDMs); including cases where multiple RDMs monitor a given Guest OS.

As explained above in connection with FIG. 6A, the Guest Operating System executes malicious code. Here, for example, the malicious code attempts to overwrite the antivirus code in the Guest Operating System; either via (2a) memory access attempts by the CPU. or (2b) memory access attempts via programming a DMA capable device to attempt to access the memory. The memory access attempt (either via CPU or DMA) triggers entry into the Separation Kernel Hypervisor.

Turning to FIG. 6B, such system or process may initiate upon entry into the SKH, at 660. Then, at 665, the Separation Kernel Hypervisor securely transitions execution to the Visualization Assistance Layer; in a manner isolated from the Guest Operating System. Next, at 670, the Visualization Assistance Layer transitions execution to the rootkit defense mechanisms. The rootkit defense mechanisms may then analyze, at 675, the behavior of the Guest Operating System and its resources and makes a policy decision; for example, it may be configured to understand the memory locations which are sensitive (e.g. contain the antivirus code locations), thus decides to deny the malicious memory access attempt. Once the policy decision(s) have been made, the rootkit defense mechanisms transition execution to the virtualization assistance layer, passing it the policy decision 680. Then, at 685, the virtualization assistance layer transitions execution back to the Separation Kernel Hypervisor, or the Separation Kernel Hypervisor transitions execution from the virtualization assistance layer back to the Separation Kernel Hypervisor. Finally, at 690, the Separation Kernel Hypervisor acts on the policy decision generated by the rootkit defense mechanisms (in this example it denies the malicious attempt to modify the antivirus code), or the Separation Kernel Hypervisor acts independently of the policy decision, but in a manner that takes the policy decision under advisement (depending on configuration). Further, the SKH may receive, analyze, and/or act upon policy decisions from multiple sources, which may include multiple RDMs; inducing cases where multiple RDMs monitor a given Guest OS.

FIGS. 7A-7B are representative sequence/flow diagrams illustrating exemplary systems, methods and Separation Kernel Hypervisor architecture consistent with certain aspects related to the innovations herein. FIGS. 7A-7B relate, inter alia, to behavior relating to the handling of guest operating system instruction sequences (e.g., execution attempts of a repeated pattern/series of MOV, RET, or MOV IRET instruction on an Intel IA32e architecture; such patterns of which may constitute code of "return oriented" attacks/rootkits). Here, in such illustrative cases, malicious code within the guest operating system is attempting to corrupt and/or subvert antivirus software and/or software integrity checkers within the guest operating system via a "return oriented" attack (attacks constructed to evade integrity checkers); and the rootkit defense mechanisms detects/prevents the attack.

Turning to the illustrative implementations/aspects of FIG. 7A, at step 705, a Guest Operating System executes malicious code. Then at step 710 Malicious code attempts a specific sequence and/or pattern of CPU instructions, this either triggers transition into the SKH for (2a) every instruction in the sequence and/or pattern (a single stepping behavior), or (2b) for a number of instructions of size greater than one of the sequence and/or pattern (multiple stepping). The (2a) or (2b) behavior is based on system configuration. Next, at step 715 the Separation Kernel Hypervisor securely transitions execution to the virtualization assistance layer; in a manner isolated from the Guest Operating System. Then, at step 720 the virtualization assistance layer transitions execution to the rootkit defense mechanisms. Next, at step 725 the rootkit defense mechanisms analyzes the behavior of the Guest Operating System and its resources and makes a policy decision; in this example, it has been configured to understand that the sequence and/or pattern of Guest OS instructions executed and/or in the process of attempting to be executed constitute a known patter of malicious attack; in this example a "Return Oriented Attack" where small sequences of code scattered throughout the Guest OS (but not necessarily a coherent object, module, process, task, thread, interrupt handler, function, or linked object) are used to jump ("return") to and from each other, in the whole acting in a malicious fashion; in this case attempting to corrupt the antivirus software and other portions of the Guest OS. Then, in step 730 the rootkit defense mechanisms transition execution to the virtualization assistance layer, passing it the policy decision. Next, in step 735 the virtualization assistance layer transitions execution back to the Separation Kernel Hypervisor, or the Separation Kernel Hypervisor transitions execution from the virtualization assistance layer back to the Separation Kernel Hypervisor. Then, in step 740 the Separation Kernel Hypervisor acts on the policy decision generated by the rootkit defense mechanisms (in this example it suspends the Guest OS, preventing the Guest OS from executing the "Return Oriented" attack; a type of attack that thwarts code integrity checkers in the Guest OS), or the Separation Kernel Hypervisor acts independently of the policy decision, but in a manner that takes the policy decision under advisement (depending on configuration). The SKH may receive, analyze, and/or act upon policy decisions from multiple sources, which may include multiple RDMs; including cases where multiple RDMs monitor a given Guest OS. Finally, in step 745, in order to continue to recognize sequences and/or patterns of instructions, execution may cycle a multiple times between steps 705 through 740.

As explained above in connection with FIG. 7A, the guest operating system executes malicious code. Here, for example, the malicious code attempts to execute a sequence and/or pattern of instructions corresponding to a "Return Oriented" attack (used to fool code integrity checkers in the Guest Operating System) or suspected attack. The attempt triggers entry into the Separation Kernel Hypervisor.

Turning to FIG. 7B, such illustrative system or process may initiates upon entry into the SKH, at 760. Then, at 765, the Separation Kernel Hypervisor securely transitions execution to the Visualization Assistance Layer; in a manner isolated from the Guest Operating System. Next, at 770, the Visualization Assistance Layer transitions execution to the rootkit defense mechanisms. The rootkit defense mechanisms may then analyze, at 775, the behavior of the Guest Operating System and its resources and makes a policy decision; in this example it recognizes the Guest Operating System instruction sequence and/or pattern as a "return oriented" attack, attempting to corrupt the Guest Operating System's antivirus software, and the policy decision is to made to deny further (and/or future) execution of the sequence and/or pattern, preventing the Guest Operating System from executing the "Return Oriented" attack. Once the policy decision(s) have been made, the rootkit defense mechanisms transition execution to the virtualization assistance layer, passing it the policy decision 780. Then, at 785, the virtualization assistance layer transitions execution back to the Separation Kernel Hypervisor, or the Separation Kernel Hypervisor transitions execution from the virtualization assistance layer back to the Separation Kernel Hypervisor. Next, at 790, the Separation Kernel Hypervisor acts on the policy decision generated by the rootkit defense mechanisms (in this example it denies the malicious attempt to modify the antivirus code), or the Separation Kernel Hypervisor acts independently of the policy decision, but in a manner that takes the policy decision under advisement (depending on configuration). Further, the SKH may receive, analyze, and/or act upon policy decisions from multiple sources, which may include multiple RDMs; inducing cases where multiple RDMs monitor a given Guest OS. In a final, optional, step 795, in order to recognize sequences and/or patterns of instructions (and/or further monitor an existing monitored sequence and/or pattern of instructions), execution may cycle a multiple times between steps 760 through 790.

FIGS. 8A-8B are representative sequence/flow diagrams illustrating exemplary systems, methods, and Separation Kernel Hypervisor architecture consistent with certain aspects related to the innovations herein. FIGS. 8A-8B relate, inter alia, to the guest operating system attempting to corrupt data (e.g., the Master Boot Record) on one of its boot devices, e.g., where the rootkit defense mechanisms detect and prevent the attack.

Turning to the illustrative implementations/aspects of FIG. 8A, at step 805, a Guest Operating System executes malicious code. Then, at step 810, malicious code may attempt to manipulate the boot sectors of the boot device of the Guest OS. In this illustrative example, it attempts to copy the Master Boot Record (MBR) of the Guest OSes boot device, encrypt and hide it for later use, then replace the MBR with a modified and malicious MBR that transitions execution to malicious code during the next Guest OS boot attempt. In the attempt to write to the MBR execution transitions to the SKH. The trigger mechanism of the transition can be of many forms (memory based, I/O port based, polling based, or a combination thereof etc.) Next, at step 815 the Separation Kernel Hypervisor securely transitions execution to the virtualization assistance layer; in a manner isolated from the Guest Operating System. Then, at step 820, the virtualization assistance layer transitions execution to the rootkit defense mechanisms. Next, at step 825 the rootkit defense mechanisms analyze the behavior of the Guest Operating System and its resources and makes a policy decision; in this example, it has been configured to understand that the Guest OS is attempting to write to the MBR from an execution context which does not correspond to the expected Guest OS tools and/or APIs typically used to access the MBR; thus the policy decision to deny the attempt is made. Then, at step 830 the rootkit defense mechanisms transition execution to the virtualization assistance layer, passing it the policy decision. Next, at step 835 the virtualization assistance layer transitions execution back to the Separation Kernel Hypervisor, or the Separation Kernel Hypervisor transitions execution from the virtualization assistance layer back to the Separation Kernel Hypervisor. Then, at step 840, the Separation Kernel Hypervisor acts on the policy decision generated by the rootkit defense mechanisms (in this example it denies the Guest OS attempt to write to the MBR), or the Separation Kernel Hypervisor acts independently of the policy decision, but in a manner that takes the policy decision under advisement (depending on configuration). The SKH may receive, analyze, and/or act upon policy decisions from multiple sources, which may include multiple RDMs; including cases where multiple RDMs monitor a given Guest OS. Then, in step 845, in order to continue to recognize sequences and/or patterns of MBR tampering, execution may cycle a multiple times between steps 805 through 840.

As explained above in connection with FIG. 8A, the Guest Operating System executes malicious code. Here, for example, the malicious code attempts to copy the Master Boot Record (MBR) of the guest OSes boot device, encrypt and hide it for later use, then replace the MBR with a modified and malicious MBR that transitions execution to malware during the next Guest OS boot attempt. The attempt triggers entry into the Separation Kernel Hypervisor.

Turning to FIG. 8B, such illustrative system or process may initiate upon entry into the SKH, at 860. Then, at 865, the Separation Kernel Hypervisor securely transitions execution to the Visualization Assistance Layer; in a manner isolated from the Guest Operating System. Next, at 870, the Visualization Assistance Layer transitions execution to the rootkit defense mechanisms. The rootkit defense mechanisms may then analyze, at 875, the behavior of the Guest Operating System and its resources and makes a policy decision. In this example, it has been configured to understand that the Guest OS is attempting to write to the MBR from an execution context which does not correspond to the expected Guest OS tools and/or APIs typically used to access the MBR; thus the policy decision to deny the attempt is made. Once the policy decision(s) have been made, the rootkit defense mechanisms transition execution to the virtualization assistance layer, passing it the policy decision 880. Then, at 885, the virtualization assistance layer transitions execution back to the Separation Kernel Hypervisor, or the Separation Kernel Hypervisor transitions execution from the virtualization assistance layer back to the Separation Kernel Hypervisor. Finally, at 890, the Separation Kernel Hypervisor acts on the policy decision generated by the rootkit defense mechanisms (in this example it denies the malicious attempt to modify the MBR), or the Separation Kernel Hypervisor acts independently of the policy decision, but in a manner that takes the policy decision under advisement (depending on configuration). Further, the SKH may receive, analyze, and/or act upon policy decisions from multiple sources, which may include multiple RDMs; inducing cases where multiple RDMs monitor a given Guest OS. In a final, optional, step 895, in order to recognize sequences and/or patterns of MBR access attempts (and/or further monitor an existing monitored sequence and/or pattern of MBR access attempts), execution may cycle a multiple times between steps 860 through 890.

FIGS. 9A-9B are representative sequence/flow diagrams illustrating exemplary systems, methods, and Separation Kernel Hypervisor architecture consistent with certain aspects related to the innovations herein. FIGS. 9A-9B relate, inter alia, to an attempt at plugging in of a USB memory stick, or an attempt for an attacker to infiltrate the guest operating system with malicious code, and/or to download sensitive code/data; here, too, the rootkit defense mechanisms detect and prevent the attack.

Turning to the illustrative implementations/aspects of FIG. 9A, at step 905, a USB memory stick infected with malware is plugged into the system and a Guest Operating System has access to that USB stick. Next, at step 910, execution transitions to the SKH. The trigger that causes the particular transition may vary (e.g., on some platforms an interrupt may trigger it). Then, at step 915 the Separation Kernel Hypervisor securely transitions execution to the virtualization assistance layer; in a manner isolated from the Guest Operating System. Then, at step 920 the virtualization assistance layer transitions execution to the rootkit defense mechanisms. Next, at step 925 the rootkit defense mechanisms analyze the behavior of the device related activity; in this case, the policy decision is made that all plugged in USB sticks must first be scanned (by another component of the system) before full access is granted to the Guest OS attempting to access the device. Then, at step 930, the rootkit defense mechanisms transition execution to the virtualization assistance layer, passing it the policy decision. Next, at step 935, the virtualization assistance layer transitions execution back to the Separation Kernel Hypervisor, or the Separation Kernel Hypervisor transitions execution from the virtualization assistance layer back to the Separation Kernel Hypervisor. Then, at step 940, the Separation Kernel Hypervisor acts on the policy decision generated by the rootkit defense mechanisms (in this example it denies the Guest OS attempt to access the USB stick), or the Separation Kernel Hypervisor acts independently of the policy decision, but in a manner that takes the policy decision under advisement (depending on configuration). The SKH may receive, analyze, and/or act upon policy decisions from multiple sources, which may include multiple RDMs; including cases where multiple RDMs monitor a given Guest OS.

As explained above in connection with FIG. 9A, the guest operating system attempts to respond to the plugging in of a USB memory stick, which may result in the execution of malicious code. Here, for example, the plug in attempt may result in an interrupt delivered to the guest operating system, to prod the Guest Operating System to load drivers and call kernel APIs which interact with the USB stick; e.g., mounting a filesystem on a partition of the USB stick; where the filesystem contains malicious code. The attempt triggers entry into the Separation Kernel Hypervisor.

Turning to FIG. 9B, such illustrative system or process may initiate upon entry into the SKH, at 960. Then, at 965, the Separation Kernel Hypervisor securely transitions execution to the Visualization Assistance Layer; in a manner isolated from the guest operating system. Next, at 970, the Visualization Assistance Layer transitions execution to the rootkit defense mechanisms. The rootkit defense mechanisms may then analyze, at 975, the behavior of the guest operating system and its resources and makes a policy decision. The rootkit defense mechanisms analyze the behavior of the device related activity; in this case, the policy decision is made that all plugged in USB sticks must first be scanned (by another component of the system) before full access is granted to the Guest OS attempting to access the device. Then, at step 980. The rootkit defense mechanisms transition execution to the virtualization assistance layer, passing it the policy decision. Next, at step 985 the virtualization assistance layer transitions execution back to the Separation Kernel Hypervisor, or the Separation Kernel Hypervisor transitions execution from the virtualization assistance layer back to the Separation Kernel Hypervisor. Then, at step 990 the Separation Kernel Hypervisor acts on the policy decision generated by the rootkit defense mechanisms (in this example it denies the Guest OS attempt to access the USB stick), or the Separation Kernel Hypervisor acts independently of the policy decision, but in a manner that takes the policy decision under advisement (depeding on configuration). The SKH may receive, analyze, and/or act upon policy decisions from multiple sources, which may include multiple RDMs; including cases where multiple RDMs monitor a given Guest OS.

FIGS. 10A-10B are representative sequence/flow diagrams illustrating exemplary systems, methods, and separation kernel hypervisor architecture consistent with certain aspects related to the innovations herein. FIGS. 10A-10B relate, inter alia, to attempts by a guest operating system to access I/O ports which may correspond to I/O ports used/probed by malicious code to tamper with, bypass etc the guest operating system or its resources; the rootkit defense mechanisms detect and prevent the attack.

Turning to the illustrative implementations/aspects of FIG. 10A, at step 1005, a guest operating system executes malicious code. Then, at step 1010 malicious code attempts an I/O port access, or instructions resulting in a series or sequence of I/O ports accesses, this either triggers transition into the SKH for either (a) individual I/O ports accesses, or (b) sequences thereof. The I/O ports targeted may be associated with various types of platform resources, including PCI configuration space I/O ports, device I/O ports, virtual device I/O ports, platform control I/O ports for firmware interfaces and/or power management controls, etc.

Next, at step 1015 the Separation Kernel Hypervisor securely transitions execution to the virtualization assistance layer; in a manner isolated from the guest operating system. Then, at step 1020, the virtualization assistance layer transitions execution to the rootkit defense mechanisms. Next, at step 1025, the rootkit defense mechanisms analyze the behavior of the guest operating system and its resources and makes a policy decision; in this example, it has been configured to understand that the sequence and/or pattern of Guest OS I/O port access attempts constitute a known pattern of malicious attack, and/or access resources forbidden to the Guest OS; e.g., malicious code in a Guest OS may attempt to conceal itself by accessing I/O ports that program/store settings in PCI configuration space, or other I/O space available to the Guest OS. Then, at step 1030, the rootkit defense mechanisms transition execution to the virtualization assistance layer, passing it the policy decision.

Next, at step 1035, the virtualization assistance layer transitions execution back to the Separation Kernel Hypervisor, or the Separation Kernel Hypervisor transitions execution from the virtualization assistance layer back to the Separation Kernel Hypervisor. Then, at step 1040, the Separation Kernel Hypervisor acts on the policy decision generated by the rootkit defense mechanisms (in this example it allows the Guest OS to continue execution, and to perform the sequence of I/O port access, in order for the rootkit defense mechanisms to record and report on such behavior, exporting the reports to an outside system for analysis; or the Separation Kernel Hypervisor acts independently of the policy decision, but in a manner that takes the policy decision under advisement (depending on configuration). The SKH may receive, analyze, and/or act upon policy decisions from multiple sources, which may include multiple RDMs; including cases where multiple RDMs monitor a given Guest OS. Then, in step 1045, in order to recognize sequences and/or patterns of I/O port access, execution may cycle a multiple times between steps 1005 through 1040.

As explained above in connection with FIG. 10A, the guest operating system executes malicious code. Here, for example, it attempts an I/O port access, or instructions resulting in a series or sequence of I/O ports accesses, this either triggers transition into the SKH for either (a) individual I/O ports accesses, or (b) sequences thereof. The I/O ports targeted may be associated with various types of platform resources, including PCI configuration space I/O ports, device I/O ports, virtual device I/O ports, platform control I/O ports for firmware interfaces and/or power management controls, etc. The attempt triggers entry into the Separation Kernel Hypervisor.

Turning to FIG. 10B, an illustrative system or process may initiate upon entry into the SKH, at 1060. Then, at 1065, the Separation Kernel Hypervisor securely transitions execution to the Visualization Assistance Layer; in a manner isolated from the guest operating system. Next, at 1070, the Visualization Assistance Layer transitions execution to the rootkit defense mechanisms. The rootkit defense mechanisms may then analyze, at 1075, the behavior of the guest operating system and its resources and makes a policy decision; in this example, it has been configured to understand that the sequence and/or pattern of Guest OS I/O port access attempts constitute a known pattern of malicious attack, and/or access resources forbidden to the Guest OS; e.g., malicious code in a Guest OS may attempt to conceal itself by accessing I/O ports that program/store settings in PCI configuration space, or other I/O space available to the Guest OS. Then, at step 1080 the rootkit defense mechanisms transition execution to the virtualization assistance layer, passing it the policy decision. Next, at step 1085 the virtualization assistance layer transitions execution back to the Separation Kernel Hypervisor, or the Separation Kernel Hypervisor transitions execution from the virtualization assistance layer back to the Separation Kernel Hypervisor. Then, at step 1090 the Separation Kernel Hypervisor acts on the policy decision generated by the rootkit defense mechanisms (in this example it denies the Guest OS attempt to write to PCI configuration space), or the Separation Kernel Hypervisor acts independently of the policy decision, but in a manner that takes the policy decision under advisement (depending on configuration). The SKH may receive, analyze, and/or act upon policy decisions from multiple sources, which may include multiple RDMs; including cases where multiple RDMs monitor a given Guest OS. Then, in step 1095, in order to continue to recognize sequences and/or patterns of I/O port access related to PCI configuration space tampering, execution may cycle a multiple times between steps 1060 through 1090.

At a high level, as may apply to the above examples, the Actions taken on monitored activity may include policy based actions taken by, and/or coordinated between, the Separation Kernel Hypervisor 100, virtualization assistance layer 400, and/or rootkit defense mechanisms 500 Such actions may include, but are not limited to any of the following:

1. Preventing the monitored activity.
2. Allowing the monitored activity.
3. Allowing the monitored activity, with instrumentation, and/or partial blocking. It may be that certain sub-sets of the activity are permissible (by configuration policy), and that a portion of the activity may be allowed and a portion blocked and/or substituted with a harmless surrogate; such as insertion of no-ops in malicious code to render malicious code inert. This may include run-time patching of CPU state of a guest operating system 300, and/or any resources of the guest operating system 300.
4. Reporting on the monitored activity, possibly exporting reports to other software in the system, or on remote systems.
5. Replay of the monitored activity. In Separation Kernel Hypervisor 100 configurations supporting rewind of guest operating system 300 state, the state of the guest operating system 300 can be rewound and the monitored activity can be replayed and re-monitored (to a degree); e.g., if the rootkit defense mechanisms 500 requires more systems resources, and/or to map more context of the guest operating system 300, the rootkit defense mechanisms 500 may request a rewind, request more resources, then request the replay of the monitored activity; so that the rootkit defense mechanisms 500 may perform analysis of the monitored activity with the advantage of more resources.

Systems and methods of monitoring activity, as may be utilized by the Separation Kernel Hypervisor 100, virtualization assistance layer 400, and/or rootkit defense mechanisms 500; for activities which may include guest operating system 300 activities, and/or Separation Kernel Hypervisor 100, virtualization assistance layer 4000, and/or rootkit defense mechanisms 500 activities (such as feedback between such components), including those activities which may cause transition to the Separation Kernel Hypervisor 100, virtualization assistance layer 400, and/or rootkit defense mechanisms 500 include (but are not limited to):

1. Polling. The Separation Kernel Hypervisor 100, virtualization assistance layer 400, and/or rootkit defense mechanisms 500 may monitor for such activities as described above based on configuration settings, or via dynamic instruction from an API exported to the virtualization assistance layer 400, rootkit defense mechanisms. The Separation Kernel Hypervisor 100, virtualization assistance layer 400, and/or rootkit defense mechanisms 500.
2. Non-polling. Non-polling may be performed by means including (but not limited to) those below:
3. Trapping. I.e., that which induces transition into the Separation Kernel Hypervisor 100 from the Guest Virtual Machine Protection Domain 200 (e.g., a VM-Exit on Intel ABIs, or analogous behavior; hardware support for transition to and from the Hypervisor Guest Mode and Hypervisor Modes on other and/or more general platform ABIs). Trapping may occur from the Guest Virtual Machine Protection Domain 200 into the Separation Kernel Hypervisor 100. Trapping may be assisted by hardware virtualization mechanisms available via the native platform and/or CPU ABI(s).
4. Synchronous, bound to a clock (e.g., a timer tick programmed by the Separation Kernel Hypervisor 100, virtualization assistance layer 400, and/or rootkit defense mechanisms 500, or other source defined by configuration). The triggers for such activities may be generated by the Separation Kernel Hypervisor 100, virtualization assistance layer 400, and/or rootkit defense mechanisms 500.
5. Synchronous, bound to a specific instruction stream and/or sequence within a processor, CPU, or platform device and/or ABI, certain elements of which can be used to trap and/or transition to/from the hypervisor. For example, instructions which induce trapping. Such events may be generated by the Separation Kernel Hypervisor 100, virtualization assistance layer 400, and/or rootkit defense mechanisms 500. Note: The CPU itself is bound to a clock, and the instruction sequence in a CPU may advance with the clock, so this case may be considered similar to the "bound to a clock" case above, but is used here to differentiate between the activities of a specific timer/clock expiration and a specific code sequence (which happens to be driven by an implicit clock not necessarily under control by specific software elements, or those which program timers/clocks for expiry).
6. Asynchronous, not bound to a clock (and/or not bound to a specific instruction stream and/or sequence within a processor, CPU, or platform device and/or ABI). For example, external interrupts, such as device based interrupts. Such activities may be generated by the Separation Kernel Hypervisor 100, virtualization assistance layer 400, and/or rootkit defense mechanisms 500. For example, the Separation Kernel Hypervisor 100 may program certain memory regions of a given guest operating system 300 for trapping into the Separation Kernel Hypervisor 100 based on DMA attempts by devices of that Guest OS to such memory regions; where such attempts consequently may generate faults and/or interrupts, which may induce trapping into the SKH. This may also include device plug-un. For example, when a USB stick is plugged into the running system, the Separation Kernel Hypervisor 100, virtualization assistance layer 400, and/or rootkit defense mechanisms 500 may detect this activity.

The innovations and mechanisms herein may also provide or enable means by which software and/or guest operating system vulnerabilities, including improper use of CPU interfaces, specifications, and/or ABIs may be detected and/or prevented; including cases where software vendors have implemented emulation and/or virtualization mechanisms improperly.

For example, given a major security vulnerability that affects many commercial hypervisors [see next paragraph], including those cases where the hardware vendor indicates that the hardware is not at fault (e.g., a CPU vendor indicates the hardware functions as specified, according to publicly available CPU ABI specifications), and that hypervisor vendors must correct their code to conform properly to the specification or face possible total compromise of their hypervisor and/or systems at runtime, innovations and mechanisms herein may detect and prevent such software and/or design failures, and/or also may be used as a secure test environment, to ensure that once a patch is applied to the vulnerable software and/or guest operating system, the patch is tested in a runtime environment that is isolated and secure from the rest of the system.

Here, for example, the present innovations are able to prevent many vulnerabilities noted in the industry. For example, see, inter alia, [1] Vulnerability reports of multiple commercial hypervisors being vulnerable due to code/ABI bugs. US-CERT Vulnerability Note VU#649219 [2] Virtualization.info article on Intel CPU hardware and multiple commercial hypervisors being vulnerable due to code/ABI bugs; and [3] CPU/hardware vendor statements regarding proper CPU function, and/or proper CPU ABI specification, regarding vulnerability described in the information above. See, e.g., US-CERT website, article of Intel Corp Information for VU#649219.

IMPLEMENTATIONS AND OTHER NUANCES

The innovations herein may be implemented via one or more components, systems, servers, appliances, other subcomponents, or distributed between such elements. When implemented as a system, such system may comprise, inter alia, components such as software modules, general-purpose CPU, RAM, etc. found in general-purpose computers, and/or FPGAs and/or ASICs found in more specialized computing devices. In implementations where the innovations reside on a server, such a server may comprise components such as CPU, RAM, etc. found in general-purpose computers.

Additionally, the innovations herein may be achieved via implementations with disparate or entirely different software, hardware and/or firmware components, beyond that set forth above. With regard to such other components (e.g., software, processing components, etc.) and/or computer-readable media associated with or embodying the present inventions, for example, aspects of the innovations herein may be implemented consistent with numerous general purpose or special purpose computing systems or configurations. Various exemplary computing systems, environments, and/or configurations that may be suitable for use with the innovations herein may include, but are not limited to: software or other components within or embodied on personal computers, appliances, servers or server computing devices such as routing/connectivity components, hand-held or laptop devices, multiprocessor systems, microprocessor-based systems, set top boxes, consumer electronic devices, network PCs, other existing computer platforms, distributed computing environments that include one or more of the above systems or devices, etc.

In some instances, aspects of the innovations herein may be achieved via logic and/or logic instructions including program modules, executed in association with such components or circuitry, for example. In general, program modules may include routines, programs, objects, components, data structures, etc. that perform particular tasks or implement particular instructions herein. The inventions may also be practiced in the context of distributed circuit settings where circuitry is connected via communication buses, circuitry or links. In distributed settings, control/instructions may occur from both local and remote computer storage media including memory storage devices.

Innovative software, circuitry and components herein may also include and/or utilize one or more type of computer readable media. Computer readable media can be any available media that is resident on, associable with, or can be accessed by such circuits and/or computing components. By way of example, and not limitation, computer readable media may comprise computer storage media and other non-transitory media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic tape, magnetic disk storage or other magnetic storage devices, or any other medium which can be used to store the desired information and can accessed by computing component. Other non-transitory media may comprise computer readable instructions, data structures, program modules or other data embodying the functionality herein, in various non-transitory formats. Combinations of the any of the above are also included within the scope of computer readable media.

In the present description, the terms component, module, device, etc. may refer to any type of logical or functional circuits, blocks and/or processes that may be implemented in a variety of ways. For example, the functions of various circuits and/or blocks can be combined with one another into any other number of modules. Each module may even be implemented as a software program stored on a tangible memory (e.g., random access memory, read only memory, CD-ROM memory, hard disk drive, etc.) to be read by a central processing unit to implement the functions of the innovations herein. Or, the modules can comprise programming instructions transmitted to a general purpose computer or to processing/graphics hardware via a transmission carrier wave. Also, the modules can be implemented as hardware logic circuitry implementing the functions encompassed by the innovations herein. Finally, the modules can be implemented using special purpose instructions (SIMD instructions), field programmable logic arrays or any mix thereof which provides the desired level performance and cost.

As disclosed herein, features consistent with the present inventions may be implemented via computer-hardware, software and/or firmware. For example, the systems and methods disclosed herein may be embodied in various forms including, for example, a data processor, such as a computer that also includes a database, digital electronic circuitry, firmware, software, or in combinations of them. Further, while some of the disclosed implementations describe specific hardware components, systems and methods consistent with the innovations herein may be implemented with any combination of hardware, software and/or firmware. Moreover, the above-noted features and other aspects and principles of the innovations herein may be implemented in various environments. Such environments and related applications may be specially constructed for performing the various routines, processes and/or operations according to the invention or they may include a general-purpose computer or computing platform selectively activated or reconfigured by code to provide the necessary functionality. The processes disclosed herein are not inherently related to any particular computer, network, architecture, environment, or other apparatus, and may be implemented by a suitable combination of hardware, software, and/or firmware. For example, various general-purpose machines may be used with programs written in accordance with teachings of the invention, or it may be more convenient to construct a specialized apparatus or system to perform the required methods and techniques.

Aspects of the method and system described herein, such as the logic, may also be implemented as functionality programmed into any of a variety of circuitry, including programmable logic devices ("PLDs"), such as field programmable gate arrays ("FPGAs"), programmable array logic ("PAL") devices, electrically programmable logic and memory devices and standard cell-based devices, as well as application specific integrated circuits. Some other possibilities for implementing aspects include: memory devices, microcontrollers with memory (such as EEPROM), embedded microprocessors, firmware, software, etc. Furthermore, aspects may be embodied in microprocessors having software-based circuit emulation, discrete logic (sequential and combinatorial), custom devices, fuzzy (neural) logic, quantum devices, and hybrids of any of the above device types. The underlying device technologies may be provided in a variety of component types, e.g., metal-oxide semiconductor field-effect transistor ("MOSFET") technologies like complementary metal-oxide semiconductor ("CMOS"), bipolar technologies like emitter-coupled logic ("ECL"), polymer technologies (e.g., silicon-conjugated polymer and metal-conjugated polymer-metal structures), mixed analog and digital, and so on.

It should also be noted that the various logic and/or functions disclosed herein may be enabled using any number of combinations of hardware, firmware, and/or as data and/or instructions embodied in various machine-readable or computer-readable media, in terms of their behavioral, register transfer, logic component, and/or other characteristics. Computer-readable media in which such formatted data and/or instructions may be embodied include, but are not limited to, non-volatile storage media in various forms (e.g., optical, magnetic or semiconductor storage media) and carrier waves that may be used to transfer such formatted data and/or instructions through wireless, optical, or wired signaling media or any combination thereof. Examples of transfers of such formatted data and/or instructions by carrier waves include, but are not limited to, transfers (uploads, downloads, e-mail, etc.) over the Internet and/or other computer networks via one or more data transfer protocols (e.g., HTTP, FTP, SMTP, and so on).

Unless the context clearly requires otherwise, throughout the description, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

Although certain presently preferred implementations of the inventions have been specifically described herein, it will be apparent to those skilled in the art to which the inventions pertain that variations and modifications of the various implementations shown and described herein may be made without departing from the spirit and scope of the inventions. Accordingly, it is intended that the inventions be limited only to the extent required by the applicable rules of law.

The invention claimed is:

1. A method of processing information involving a separation kernel hypervisor, the method comprising:
    partitioning hardware platform resources via a separation kernel hypervisor into a plurality of guest operating system virtual machine protection domains; isolating the domains in time and space from each other;
    hosting the plurality of quest operating system virtual machine protection domains by the separation kernel hypervisor;
    providing a dedicated virtualization assistance layer (VAL) including a virtual representation of the hardware platform in each of the quest operating system virtual machine protection domains such that the dedicated VAL security processing is not performed in the separation kernel hypervisor;
    hosting at least one malicious code defense mechanism that executes within the virtual hardware platform in each of the plurality of quest operating system virtual machine protection domains via the separation kernel hypervisor;
    triggering entry into the separation kernel hypervisor upon execution of code involving an I/O port access attempt in a suspect guest operating system;
    transitioning execution of the access attempt from the separation kernel hypervisor to the virtualization assistance layer in a manner isolated from the suspect guest operating system;
    transitioning execution of the access attempt from the virtualization assistance layer to a malicious code defense mechanism;
    analyzing by the malicious code defense mechanism behavior of the suspect guest operating system and determining a policy decision;
    passing the policy decision and transitioning execution of the access attempt from the malicious code defense mechanism to the virtualization assistance layer; and
    passing the policy decision and transitioning execution of the access attempt from the virtualization assistance layer to the separation kernel hypervisor, wherein the separation kernel hypervisor performs enforcement or executes an action based on the policy decision.

2. The method of claim 1, further comprising:
    implementing at least one routine or component to prohibit the guest operating system virtual machine protection domains from tampering with, corrupting, or bypassing the malicious code defense mechanism.

3. The method of claim 1, wherein the plurality of guest operating system virtual machine protection domains includes corresponding guest operating systems; and
    further comprising isolating loss of security in one of the guest operating system virtual machine protection domains to the one domain having the loss of security, such that security is not broken in all the domains.

4. The method of claim 1, further comprising:
    detecting in each of the domains their own suspect code as a function of the isolated domains.

5. The method of claim 1, further comprising:
    executing one or more malicious code defense mechanisms while preventing interference, corruption, tampering with, or bypassing involving the plurality of guest operating system virtual machine protection domains.

6. The method of claim 1 further comprising:
    executing the guest operating system virtual machine protection domains to provide an isolated and secure software execution environment, wherein each of the guest operating system virtual machine protection domains include a guest operating system, virtualization assistance layer and a malicious code defense mechanism.

7. The method of claim 1, further comprising:
    trapping access to an I/O port assigned to the guest operating system;
    passing data associated with the trapped access to the virtualization assistance layer and the malicious code defense mechanism.

8. The method of claim 1, further comprising:
    monitoring patterns of guest operating system I/O port access by at least one of the virtualization assistance layer, malicious code defense mechanism, and separation kernel hypervisor based on a feedback mechanism.

9. The method of claim 1, further comprising:
    monitoring guest operating system instructions involving access of an I/O port.

10. The method of claim 1, further comprising:
    trapping access to instructions involving access of an I/O port to the guest operating system;
    passing data associated with the trapped access to the virtualization assistance layer or the malicious code defense mechanism.

11. The method of claim 1 further comprising:
    executing the malicious code defense mechanism while preventing interference, bypassing, corrupting, tampering by the plurality of guest operating system virtual machine protection domains.

12. The method of claim 1, further comprising:
    providing the guest operating system, the virtualization assistance layer and the malicious code defense mechanism in the guest operating system virtual machine protection domains rather than in the separation kernel hypervisor.

13. The method of claim 1, further comprising:
moving virtualization processing to subcomponents within each guest operating system wherein substantially all analysis and security testing is performed within each guest operating system such that the separation kernel hypervisor is of reduced size or complexity.

14. The method of claim 1, further comprising:
viewing the virtualization component within each domain as separate hardware by a guest such that bypass is prevented.

15. A method of processing information involving a separation kernel hypervisor, the method comprising:
partitioning hardware platform resources to isolate in time and space a plurality of guest operating system virtual machine protection domains;
executing the guest operating system virtual machine protection domains to provide an isolated and secure software execution environment, wherein each of the guest operating system virtual machine protection domains include a guest operating system, virtualization assistance layer and a malicious code defense mechanism;
hosting the plurality of guest operating system virtual machine protection domains by the separation kernel hypervisor;
hosting, via the separation kernel hypervisor, one or more malicious code defense mechanisms that each execute within a corresponding and respective protection domain of the plurality of guest operating system virtual machine protection domains;
triggering entry into the separation kernel hypervisor upon execution of code involving an I/O port access attempt in a suspect guest operating system;
transitioning execution of the access attempt from the separation kernel hypervisor to the virtualization assistance layer in a manner isolated from the suspect guest operating system;
transitioning execution of the access attempt from the virtualization assistance layer to a malicious code defense mechanism;
analyzing by the malicious code defense mechanism behavior of the suspect guest operating system and determining a policy decision;
passing the policy decision and transitioning execution of the access attempt from the malicious code defense mechanism to the virtualization assistance layer; and
passing the policy decision and transitioning execution of the access attempt from the virtualization assistance layer to the separation kernel hypervisor, wherein the separation kernel hypervisor performs enforcement or executes an action based on the policy decision.

16. The method of claim 15 further comprising:
implementing at least one routine or component to prohibit the guest operating system virtual machine protection domains from tampering with, corrupting, or bypassing the malicious code defense mechanism.

17. The method of claim 15, further comprising isolating loss of security in one of the guest operating system virtual machine protection domains to the one domain having the loss of security, such that security is not broken in all the domains.

18. The method of claim 17, further comprising:
providing a dedicated virtualization assistance layer (VAL) in each guest operating system such that the dedicated VAL security processing is not performed in the separation kernel hypervisor.

19. The method of claim 15, further comprising:
providing the guest operating system, the virtualization assistance layer and the malicious code defense mechanism in the guest operating system virtual machine protection domains rather than in the separation kernel hypervisor.

20. The method of claim 15, further comprising:
moving virtualization processing to subcomponents within each guest operating system wherein substantially all analysis and security testing is performed within each guest operating system such that the separation kernel hypervisor is of reduced size or complexity.

21. The method of claim 15, further comprising:
detecting in each of the domains their own suspect code as a function of the isolated domains.

22. The method of claim 15, further comprising:
viewing the virtualization component within each domain as separate hardware by a guest such that bypass is prevented.

23. The method of claim 15, further comprising:
executing one or more malicious code defense mechanisms while preventing interference, corruption, tampering, bypassing by the plurality of guest operating system virtual machine protection domains.

24. The method of claim 15, further comprising:
trapping access to an I/O port assigned to the guest operating system;
passing data associated with the trapped access to the virtualization assistance layer and the malicious code defense mechanism.

25. The method of claim 15, further comprising:
monitoring patterns of guest operating system I/O port access by at least one of the virtualization assistance layer, malicious code defense mechanism, and separation kernel hypervisor based on a feedback mechanism.

26. The method of claim 15, further comprising:
monitoring guest operating system instructions involving access of an I/O port.

27. The method of claim 15, further comprising:
trapping access to instructions involving access of an I/O port to the guest operating system;
passing data associated with the trapped access to the virtualization assistance layer or the malicious code defense mechanism.

* * * * *